US012784139B2

(12) United States Patent
Guhan et al.

(10) Patent No.: US 12,784,139 B2
(45) Date of Patent: Nov. 3, 2026

(54) CONTEXTUAL MEDIA GENERATION

(71) Applicant: ADOBE INC., San Jose, CA (US)

(72) Inventors: Pooja Guhan, College Park, MD (US); Saayan Mitra, San Jose, CA (US); Somdeb Sarkhel, San Jose, CA (US); Ritwik Sinha, Cupertino, CA (US); Stefano Petrangeli, San Francisco, CA (US); Viswanathan Swaminathan, Saratoga, CA (US)

(73) Assignee: ADOBE INC., San Jose, CA (US)

( * ) Notice: Subject to any disclaimer, the term of this patent is extended or adjusted under 35 U.S.C. 154(b) by 429 days.

(21) Appl. No.: 18/178,018

(22) Filed: Mar. 3, 2023

(65) Prior Publication Data

US 2024/0296519 A1 Sep. 5, 2024

(51) Int. Cl.
*G06T 5/50* (2006.01)
*G06T 5/92* (2024.01)
*G06T 7/90* (2017.01)
*G06T 11/00* (2026.01)

(52) U.S. Cl.
CPC .................. *G06T 5/50* (2013.01); *G06T 5/92* (2024.01); *G06T 7/90* (2017.01)

(58) Field of Classification Search
CPC .... G06T 5/50; G06T 5/92; G06T 7/90; G06T 11/00; G06N 3/092
See application file for complete search history.

(56) References Cited

U.S. PATENT DOCUMENTS 10,817,981 B1 * 10/2020 Belkin ..................... G06N 5/01
11,594,016 B1 * 2/2023 Zhou ...................... G06V 20/56
2020/0293586 A1 * 9/2020 Singhal ................. G06F 16/908
2020/0349119 A1 * 11/2020 Yang ................... G06F 16/1734
2020/0394773 A1 * 12/2020 Wilensky .............. G06F 3/0484
2021/0350223 A1 * 11/2021 Eggenberger ............ G06N 3/08
2022/0130019 A1 * 4/2022 Jeong ...................... G06F 21/32
2022/0297290 A1 * 9/2022 Berkenkamp ........ G05D 1/0016
2023/0017951 A1 * 1/2023 Kim ....................... G06N 3/092
2023/0129189 A1 * 4/2023 Takami ................ G05B 13/042 700/47

(Continued)

FOREIGN PATENT DOCUMENTS

CN 113156972 A * 7/2021 ........... G05D 1/0223

OTHER PUBLICATIONS

Mittal, et al., "BOhance: Bayesian Optimization for Content Enhancement", in 2021 IEEE International Symposium on Multimedia (ISM), Nov. 2021, pp. 17-24, available at https://ieeexplore.ieee.org/document/9666108.

(Continued)

*Primary Examiner* — Amandeep Saini
*Assistant Examiner* — Emma Rose Goebel
(74) *Attorney, Agent, or Firm* — F. CHAU & ASSOCIATES, LLC

(57) ABSTRACT

Systems and methods for media generation are provided. According to one aspect, a method for media generation includes obtaining a media object and context data describing a context of the media object, wherein the media object comprises one or more modification parameters; generating a modified media object by adjusting the one or more modification parameters using a reinforcement learning model based on the context data; and providing the modified media object within the context.

20 Claims, 16 Drawing Sheets

(56) References Cited

U.S. PATENT DOCUMENTS

2023/0305544 A1* 9/2023 Kunde ............. G05B 19/41885
2023/0419599 A1* 12/2023 Chai ..................... G06T 19/006

OTHER PUBLICATIONS

Li, et al., "Context-dependent Ranking and Selection under a Bayesian Framework", arXiv preprint arXiv:2012.05577v1 [stat.ME] Dec. 10, 2020, 11 pages.
Hwang, et al., "Context-Based Automatic Local Image Enhancement", in European Conference on Computer Vision 2012, Part I, LNCS 7572, pp. 569-582, Springer 2012, 14 pages.
Ma, et al., "Learning Deep Context-Sensitive Decomposition for Low-Light Image Enhancement", arXiv preprint arXiv:2112.05147v1 [eess.IV] Dec. 9, 2021, 15 pages.
Zhang, et al., "Better Than Reference in Low Light Image Enhancement: Conditional Re-Enhancement Networks", arXiv preprint arXiv:2008.11434v1 [eess.IV] Aug. 26, 2020, 10 pages.
Xue, et al., "Video Enhancement with Task-Oriented Flow", arXiv preprint arXiv:1711.09078v3 [cs.CV] Nov. 10, 2019, 20 pages.
Dou, et al., "Webthetics: Quantifying webpage aesthetics with deep learning", in International Journal of Human-Computer Studies 124, pp. 56-66, 2019, 11 pages.
Agarwal, et al., "Online Models for Content Optimization", in Advances in Neural Information Processing Systems 21 (NIPS 2008), 8 pages.
Kang, et al., "Personalization of Image Enhancement", in Proceedings/CVPR, IEEE Computer Society Conference on Computer Vision and Pattern Recognition, Jul. 2010, 9 pages.
Caicedo, et al., "Collaborative Personalization of Image Enhancement", in CVPR 2011, pp. 249-256, 2011, 8 pages.
Chen, et al., "Deep Photo Enhancer: Unpaired Learning for Image Enhancement from Photographs with GANs", in CVPR 2018, pp. 6306-6314, 2018, 9 pages.
Ren, et al., "Personalized Image Aesthetics", in ICCV 2017, pp. 638-647, 2017, 10 pages.
Park, et al., "Personalized Image Aesthetic Quality Assessment by Joint Regression and Ranking", in 2017 IEEE Winter Conference on Applications of Computer Vision (WACV), pp. 1206-1214, Mar. 2017, available at https://eeexplore.ieee.org/document/7926722.
Hu, et al., "Exposure: A White-Box Photo Post-Processing Framework", arXiv preprint arXiv:1709.09602v2 [cs.GR] Feb. 6, 2018, 23 pages.
Lahoud, et al., "Keyword-based image color re-rendering with semantic segmentation", in 2017 IEEE International Conference on Image Processing (ICIP), pp. 2936-2940, Sep. 2017, available at https://ieeexplore.ieee.org/document/8296820.
Lindner, et al., "Joint Statistical Analysis of Images and Keywords with Applications in Semantic Image Enhancement", in MM '12: Proceedings of the 20th ACM international conference on Multimedia, Oct. 2012, 10 pages.
Fischer, et al., "NICER: Aesthetic Image Enhancement with Humans in the Loop", arXiv preprint arXiv:2012.01778v1 [cs.HC] Dec. 3, 2020, 6 pages.
Yu, et al., "Crafting a Toolchain for Image Restoration by Deep Reinforcement Learning", arXiv preprint arXiv:1804.03312v1 [cs.CV] Apr. 10, 2018, 10 pages.
Palan, et al., "Learning Reward Functions by Integrating Human Demonstrations and Preferences", arXiv preprint arXiv:1906.08928v1 [cs.RO] Jun. 21, 2019, 11 pages.
Wu, et al., "A Survey of Human-in-the-loop for Machine Learning", arXiv preprint arXiv:2108.00941v3 [cs.LG] Apr. 26, 2022, 22 pages.
Bychkovsky, et al., "Learning photographic global tonal adjustment with a database of input / output image pairs", in CVPR 2011, Jun. 2011, available at https://ieeexplore.ieee.org/document/5995332.
Yang, et al., "Perceptual Quality Assessment of Screen Content Images", in IEEE Transactions on Image Processing, vol. 24, Issue 11, pp. 4408-4421, Nov. 2015, available at https:/ieeexplore.ieee.org/abstract/document/7180347.
Shen, et al., "Webpage Saliency", in European Conference on Computer Vision 2014, 15 pages.
Lillicrap, et al., "Continuous control with deep reinforcement learning", arXiv preprint arXiv:1509.02971v6 [cs.LG] Jul. 5, 2019, 14 pages.
Silver, et al., "Deterministic Policy Gradient Algorithms", in Proceedings of the 31st International Conference on Machine Learning, 2014, 9 pages.
Mnih, et al., "Asynchronous Methods for Deep Reinforcement Learning", arXiv preprint arXiv:1602.01783v2 [cs.LG] Jun. 16, 2016, 19 pages.
Christiano, et al., "Deep Reinforcement Learning from Human Preferences", arXiv preprint arXiv:1706.03741v3 [stat.ML] Jul. 13, 2017, 17 pages.
Szegedy, et al., "Rethinking the Inception Architecture for Computer Vision", in CVPR 2016, pp. 2818-2826, 9 pages.
Katz, et al., "Preference-based Learning of Reward Function Features", arXiv preprint arXiv:2103.02727v1 [cs.RO] Mar. 3, 2021, 8 pages.
Bradley and Terry, "Rank Analysis of Incomplete Block Designs: I. The Method of Paired Comparisons", in Biometrika, vol. 39, No. 3/4, Dec. 1952, pp. 324-345, Oxford University Press, available at https://academic.oup.com/biomet/article-abstract/39/3-4/324/326091?redirectedFrom=fulltext.
Guhan, et al., "Contextualized styling of images for web interfaces using reinforcement learning," in 2022 IEEE International Symposium on Multimedia (ISM), Dec. 2022, available at https://ieeexplore.ieee.org/document/10019633/authors#authors.

* cited by examiner $$s_t = [f_t, a_{t-1}, c]$$

Algorithm 1
WARMUP: Unsupervised Exploration

```
Initialize parameters of Q_w and π_ψ and a replay
  buffer 𝓑 ← ∅
B ← mini-batch size
for each iteration do
    for each timestep t do
        Select action a_t by taking a_t ~ π_ψ(a_t|s_t)
        Execute a_t
        Observe reward r_0^t, new state s_{t+1}
        𝓑 ← 𝓑 ∪ {(s_t, a_t, s_{t+1}, r_0^t)}
    end for
    for each gradient step do
        Sample {(s_j, a_j, s_{j+1}, r_0^j)}_{j=1}^B ~ 𝓑
        Optimize 𝓛_c^{DDPG} & 𝓛_a^{DDPG}
    end for
end for
return 𝓑, π_ψ
```

1100

FIG. 11

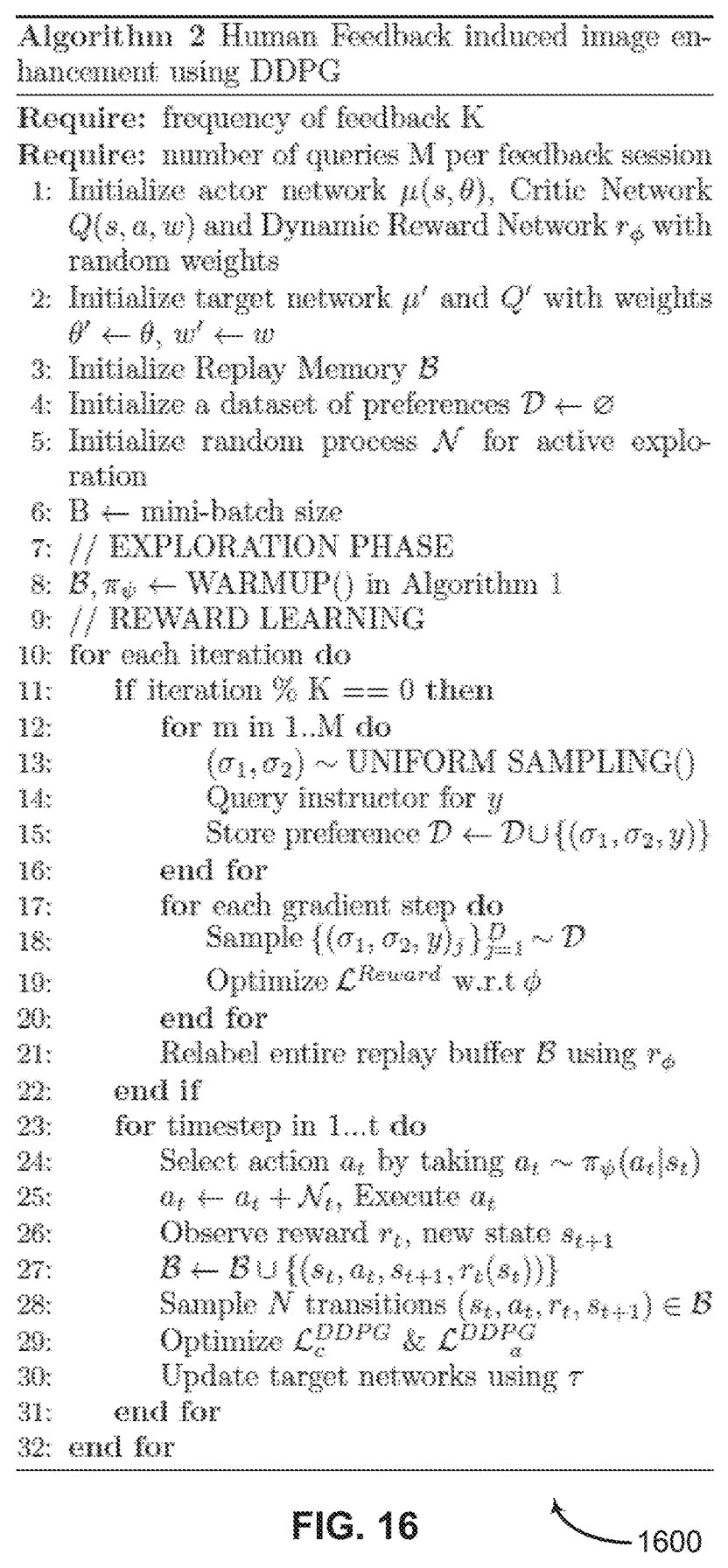

Algorithm 2 Human Feedback induced image enhancement using DDPG

Require: frequency of feedback K
Require: number of queries M per feedback session
Initialize actor network $\mu(s, \theta)$, Critic Network $Q(s, a, w)$ and Dynamic Reward Network $r_\phi$ with random weights
Initialize target network $\mu'$ and $Q'$ with weights $\theta' \leftarrow \theta$, $w' \leftarrow w$
Initialize Replay Memory $\mathcal{B}$
Initialize a dataset of preferences $\mathcal{D} \leftarrow \varnothing$
Initialize random process $\mathcal{N}$ for active exploration
B $\leftarrow$ mini-batch size
// EXPLORATION PHASE
$\mathcal{B}, \pi_\phi \leftarrow$ WARMUP() in Algorithm 1
// REWARD LEARNING
for each iteration do
    if iteration % K == 0 then
        for m in 1..M do
            $(\sigma_1, \sigma_2) \sim$ UNIFORM SAMPLING()
            Query instructor for $y$
            Store preference $\mathcal{D} \leftarrow \mathcal{D} \cup \{(\sigma_1, \sigma_2, y)\}$
        end for
        for each gradient step do
            Sample $\{(\sigma_1, \sigma_2, y)_j\}_{j=1}^{D} \sim \mathcal{D}$
            Optimize $\mathcal{L}^{Reward}$ w.r.t $\phi$
        end for
        Relabel entire replay buffer $\mathcal{B}$ using $r_\phi$
    end if
    for timestep in 1...t do
        Select action $a_t$ by taking $a_t \sim \pi_\phi(a_t|s_t)$
        $a_t \leftarrow a_t + \mathcal{N}_t$, Execute $a_t$
        Observe reward $r_t$, new state $s_{t+1}$
        $\mathcal{B} \leftarrow \mathcal{B} \cup \{(s_t, a_t, s_{t+1}, r_t(s_t))\}$
        Sample $N$ transitions $(s_t, a_t, r_t, s_{t+1}) \in \mathcal{B}$
        Optimize $\mathcal{L}_c^{DDPG}$ & $\mathcal{L}_a^{DDPG}$
        Update target networks using $\tau$
    end for
end for

FIG. 16

1600

CONTEXTUAL MEDIA GENERATION

BACKGROUND

The following relates to media generation. Media is often presented in a context. For example, an image is often viewed on a website. Media that is stylized to fit the context that the media will be presented in can help deliver a more impactful, meaningful, and personalized user experience than contextually independent media.

However, manually editing media in order to blend well with a context can be difficult and time-consuming. There is therefore a need in the art for contextual media generation systems and methods.

SUMMARY

Embodiments of the present disclosure provide a media generation system that uses a reinforcement learning model (for example, a machine learning-based reinforcement learning model) to generate a variant of a media object based on a context. By using reinforcement learning to generate the variant based on the context, the media generation system can thereby edit a media object to fit the context.

A method, apparatus, non-transitory computer readable medium, and system for are described. One or more aspects of the method, apparatus, non-transitory computer readable medium, and system include obtaining a media object and context data describing a context of the media object, wherein the media object comprises one or more modification parameters; generating a modified media object by adjusting the one or more modification parameters using a reinforcement learning model based on the context data; and providing the modified media object within the context.

A method, apparatus, non-transitory computer readable medium, and system for are described. One or more aspects of the method, apparatus, non-transitory computer readable medium, and system include obtaining a media object and context data describing a context of the media object, wherein the media object comprises one or more modification parameters; generating a modified media object by adjusting the one or more modification parameters using a reinforcement learning model based on the context data; computing a reward value on the modified media object; and updating parameters of the reinforcement learning model based on the reward value.

An apparatus, system, and method for are described. One or more aspects of the apparatus, system, and method include a processor; a memory including instructions executable by the processor to perform the steps of: obtaining a media object and context data describing a context of the media object, wherein the media object comprises one or more modification parameters; selecting, by a reinforcement learning model, an action for modifying the one or more modification parameters based on the context data; and generating, by a media editing application, a modified media object by adjusting the one or more modification parameters based on the action.

BRIEF DESCRIPTION OF THE DRAWINGS

FIG. 11 shows an example of an algorithm for unsupervised exploration using a reinforcement learning model according to aspects of the present disclosure.

FIG. 16 shows an example of an algorithm for updating a reinforcement learning model according to aspects of the present disclosure.

DETAILED DESCRIPTION

Figure 1:
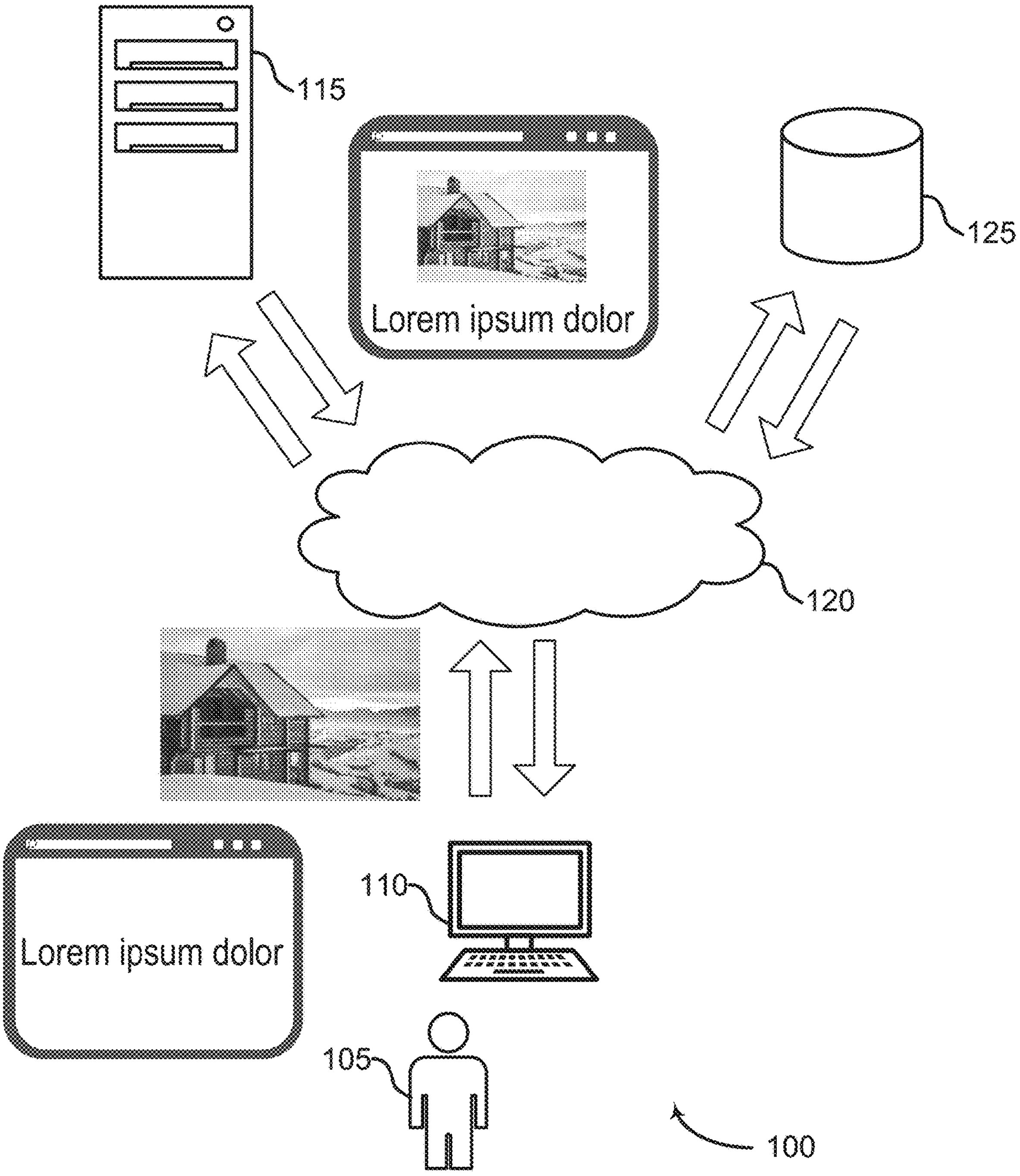
FIG. 1 shows an example of a media generation system according to aspects of the present disclosure.

Embodiments of the present disclosure relate to media generation. Media is often presented in a context (e.g., circumstances under which media is provided to a user). For example, an image is often viewed on a website. Media that is stylized to fit the context it will be presented in can help deliver a more impactful, meaningful, and personalized user experience than contextually independent media.

Examples of a context could include a website's design template, a target user, a role of the target user, a task at hand or a step in the task, a location of the user, a time and date, a user device being used, etc. Manually styling the media to blend well with the context can be difficult and time-consuming, and creating and delivering user-resonating contextual media at scale is a very challenging task.

A conventional approach to media contextualization can include traditional methods like Bayesian optimization and A/B testing. However, these traditional methods are feasible only in situations in which a specific design template is chosen from a limited set of design templates for a given context. In a real-world scenario, possible media variations are not predefined and are virtually infinite. For example, an image can be stylized in terms of vibrance, saturation, exposure contrast, etc., while taking into account website specific features like font size, font color, theme, background styles, etc., or other context such as a user role, a location of the user, a time and date, etc.

Embodiments of the present disclosure generate a contextualized media object by optimizing features of a media object based on context associated with the media object. In particular, in some cases, embodiments of the present disclosure use a reinforcement learning model to efficiently search across a vast space of media variations to select an optimized variation based on the context. In some cases, the reinforcement learning model leverages knowledge gained from past optimizations to accelerate the search for the optimized media variation for the context. In other words, in some cases, a media generation system uses reinforcement learning to learn how to generate a modified media object based on an input media object and a context, where the modified media object is optimized for the context. Embodiments of the present disclosure thereby provide a media generation technology having an increased efficiency than conventional media generation systems.

Additionally, in some cases, the reinforcement learning model uses a reward function that is trained based on human feedback to mimic preferences of human users when evaluating modified media objects generated by the reinforcement learning model. Accordingly, in some cases, the media generation system automatically modifies and optimizes a media object based on the context that the media is associated with in terms of user perception of the modified media object within the context. The modified media object is optimized without constraining the modified media object to a pre-defined variant template of the media object. Such a data-driven and adaptive framework can help content creators save time and effort.

An example of the present disclosure is used in an image generation setting. For example, a user wants to edit an image (e.g., a media object) so that the image will aesthetically look better when included on a website (e.g., a context). For example, in some cases, the user is interested in editing the image to better suit the background color, text font, and text color (e.g., context data) of the website.

The user provides the image and the context data to the media generation system. The media generation system uses a reinforcement learning model to take iterative actions to generate iterative images based on iterative states, where the state corresponds to the image at a given time, a previous action, and the context data. In some cases, the action is also taken based on iterative rewards that evaluate a success of an action in terms of how appropriate an iteratively generated image is for the context, as would be perceived by a human observer. The media generation system thereby generates a new image as a final iteration that is optimized for the context.

Figure 5:
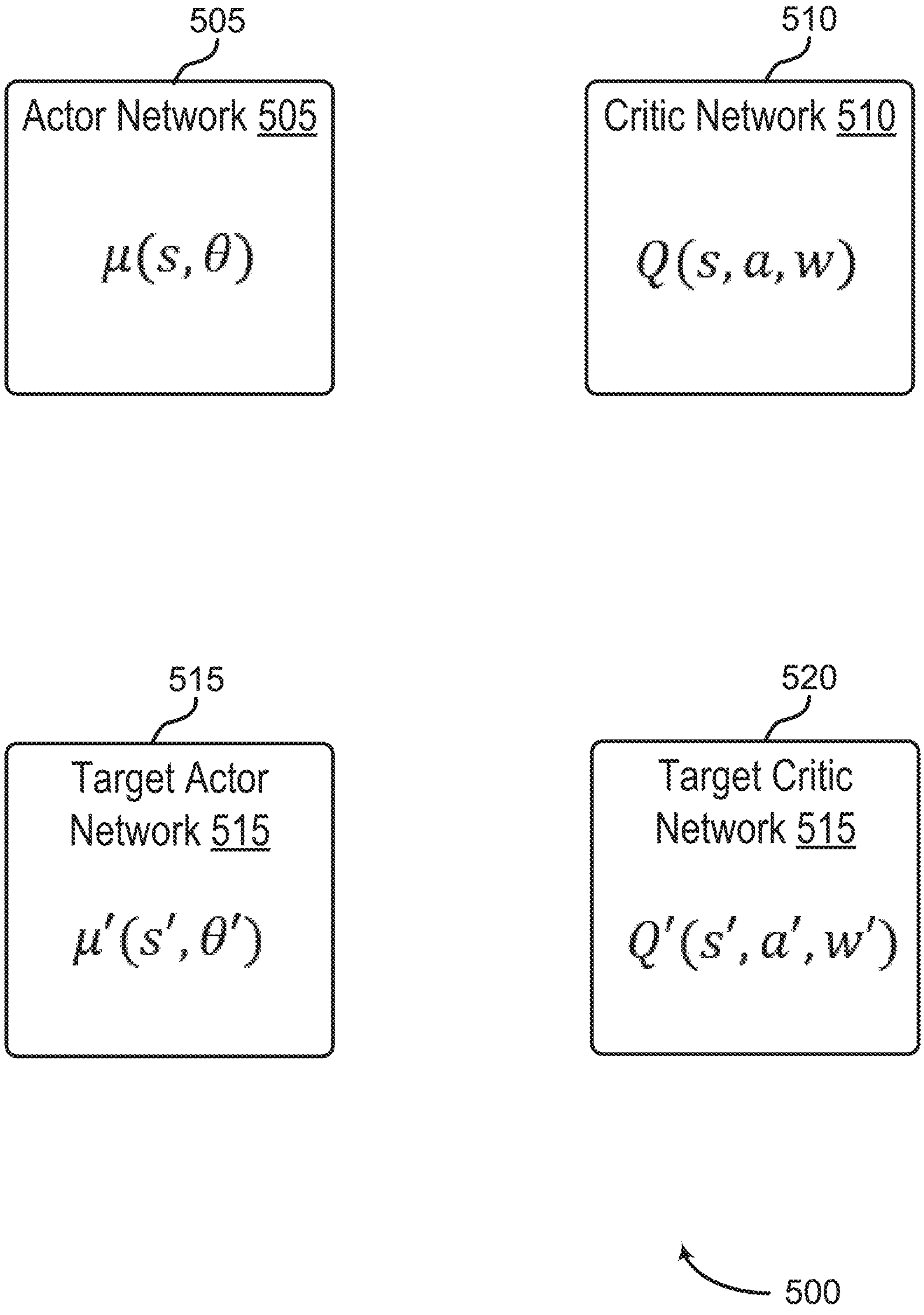
FIG. 5 shows an example of an agent according to aspects of the present disclosure.
Figure 6:
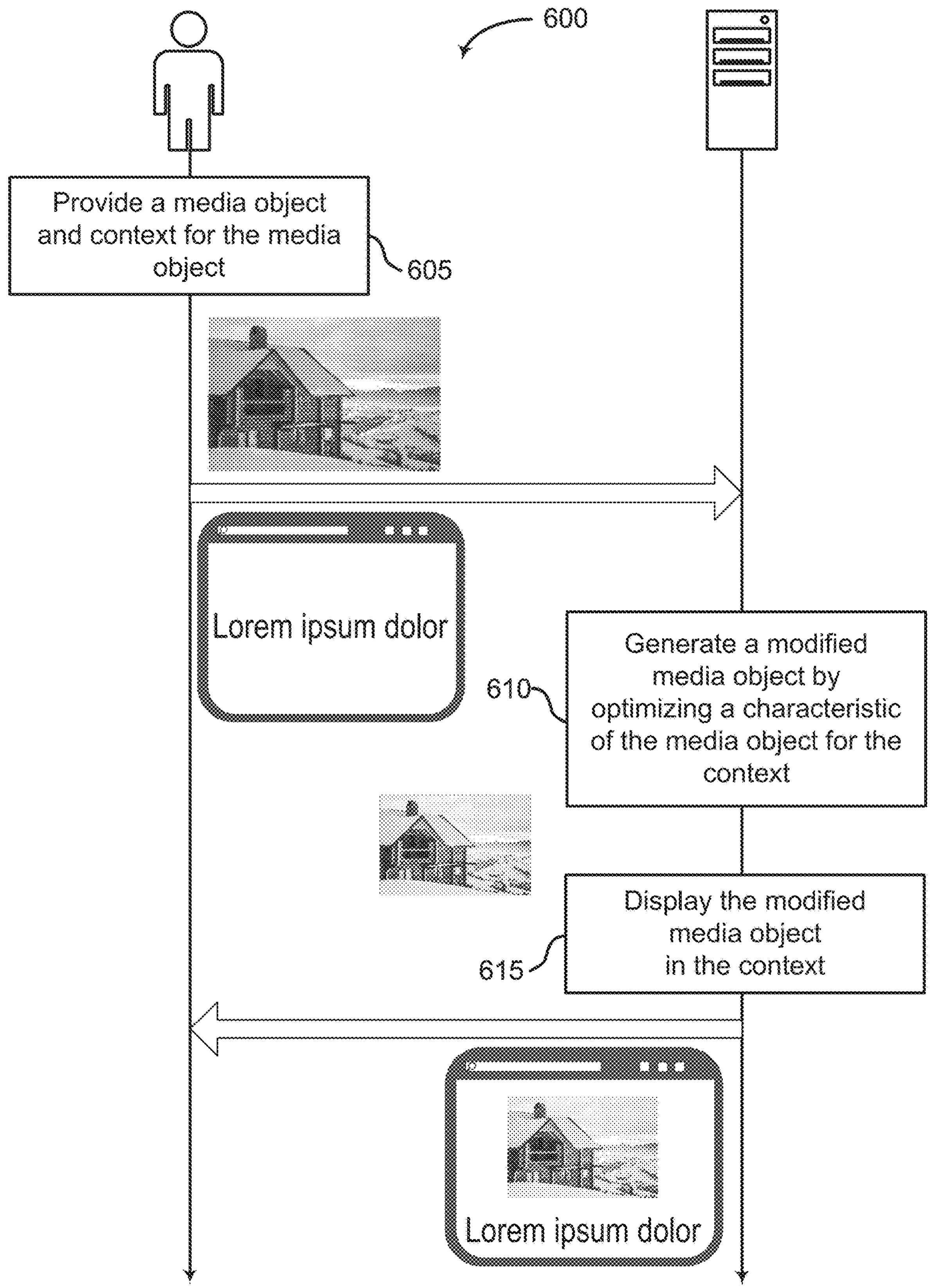
FIG. 6 shows an example of a method for modifying a media object for a context according to aspects of the present disclosure.

Further example applications of the media generation system in an image generation setting are provided with reference to FIGS. 1 and 6. Examples of a media generation system are provided with reference to FIGS. 1-5. Examples of a process for media generation are provided with reference to FIGS. 6-12. Examples of a process for training a reinforcement learning model are provided with reference to FIGS. 13-16.

Media Generation System

A system and an apparatus for media generation is described with reference to FIGS. 1-5. One or more aspects of the system and the apparatus include a processor; and a memory including instructions executable by the processor to perform the steps of: obtaining a media object and context data describing a context of the media object, wherein the media object comprises one or more modification parameters; selecting, by a reinforcement learning model, an action for modifying the one or more modification parameters based on the context data; and generating, by a media editing application, a modified media object by adjusting the one or more modification parameters based on the action.

Some examples of the system and the apparatus further include a contextual media interface configured to display the modified media object within the context. Some examples of the system and the apparatus further include a reward network configured to compute a reward value for the reinforcement learning model based on the modified media object. Some examples of the system and the apparatus further include a training component configured to update parameters of the reward network based on instructor feedback.

FIG. 1 shows an example of a media generation system 100 according to aspects of the present disclosure. The example shown includes media generation system 100, user 105, user device 110, media generation apparatus 115, cloud 120, and database 125.

Referring to FIG. 1, user 105 provides a media object (in this case, an image) and a context (in this case, a website featuring a white background color, an Arial font, and a black font color) to media generation apparatus 115 via user device 110. In some cases, user 105 directly provides context data corresponding to the background color, the font, and the font color. In some cases, media generation apparatus 115 extracts the context data from the context. In some cases, media generation apparatus 115 generates a modified media object (in this case, a modified image including content of the image and an altered brightness, hue, and contrast from the image) using a reinforcement learning model. In some cases, media generation apparatus 115 provides the modified media object to user 105 via a contextual media interface displayed by media generation apparatus 115 on user device 110.

According to some aspects, user device 110 is a personal computer, laptop computer, mainframe computer, palmtop computer, personal assistant, mobile device, or any other suitable processing apparatus. In some examples, user device 110 includes software, such as a graphical user interface, that displays and facilitates the communication of information, such as a media object, a modified media object, a context, and context data between user 105 and media generation apparatus 115.

According to some aspects, a user interface enables user 105 to interact with user device 110. In some embodiments, the user interface may include an audio device, such as an external speaker system, an external display device such as a display screen, or an input device (e.g., a remote-control device interfaced with the user interface directly or through an IO controller module). In some cases, the user interface may be a graphical user interface (GUI).

According to some aspects, media generation apparatus 115 includes a computer implemented network. In some embodiments, the computer implemented network includes a machine learning model (for example, a reinforcement learning model described with reference to FIGS. 2-4). In some embodiments, media generation apparatus 115 also includes one or more processors, a memory subsystem, a communication interface, an I/O interface, one or more user interface components, and a bus. Additionally, in some embodiments, media generation apparatus 115 communicates with user device 110 and database 125 via cloud 120.

In some cases, media generation apparatus 115 is implemented on a server. A server provides one or more functions to users linked by way of one or more of various networks, such as cloud 120. In some cases, the server includes a single microprocessor board that includes a microprocessor responsible for controlling all aspects of the server. In some cases, the server uses a microprocessor and a protocol, such as hypertext transfer protocol (HTTP), simple mail transfer protocol (SMTP), file transfer protocol (FTP), simple network management protocol (SNMP), or the like, to exchange data with other devices or users on one or more of the networks. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Media generation apparatus 115 is an example of, or includes aspects of, the corresponding element described with reference to FIG. 2. Further detail regarding the architecture of media generation apparatus 115 are provided with reference to FIGS. 1-5. Further detail regarding a process for media generation are provided with reference to FIGS. 6-12. Further detail regarding a process for training a reinforcement learning model are provided with reference to FIGS. 13-16.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, media generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to media generation apparatus 115 and communicates with media generation apparatus 115 via cloud 120. According to some aspects, database 125 is included in media generation apparatus 115. Database 125 is an example of, or includes aspects of, the corresponding element described with reference to FIG. 15.

Figure 2:
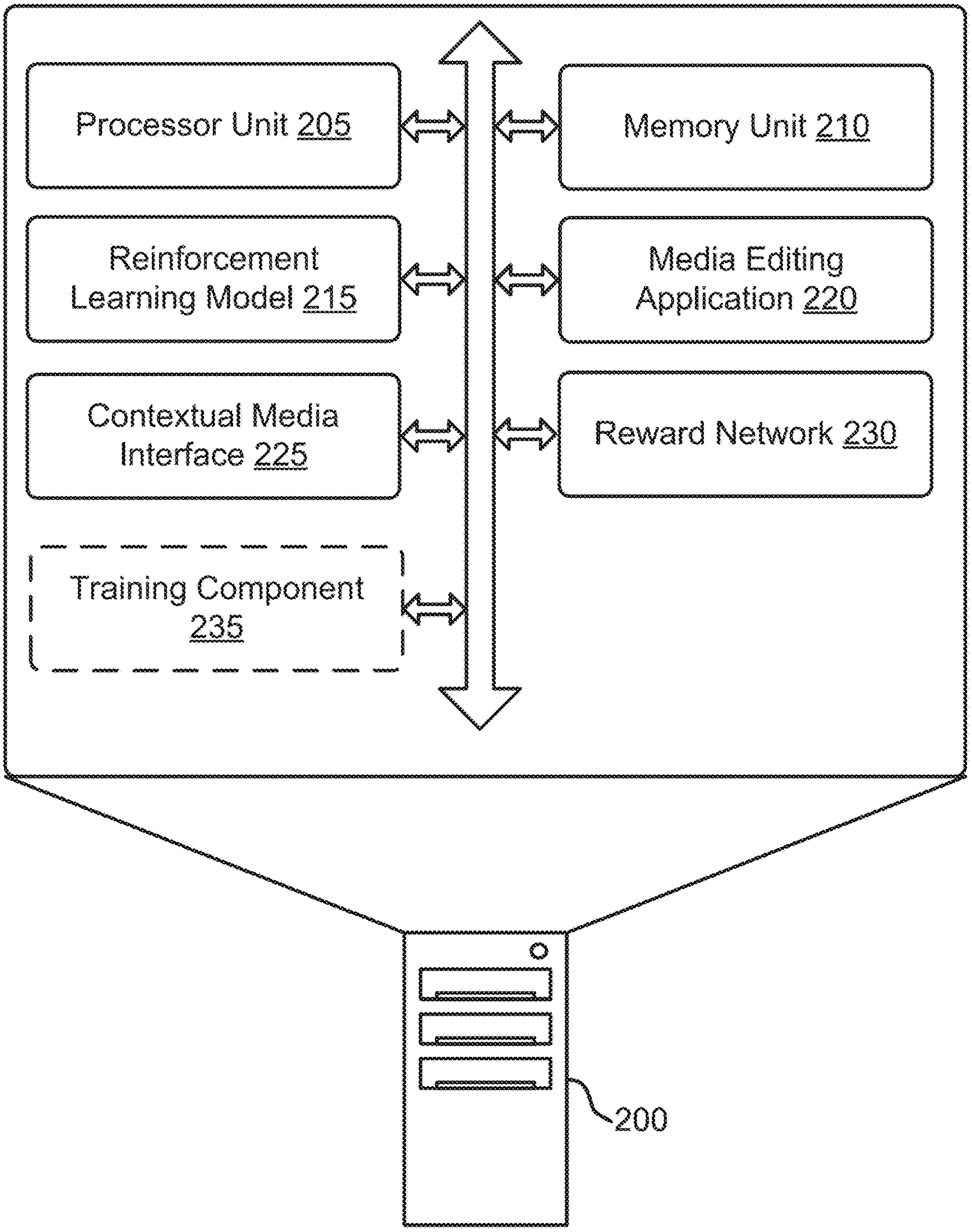
FIG. 2 shows an example of a media generation apparatus according to aspects of the present disclosure.

FIG. 2 shows an example of a media generation apparatus 200 according to aspects of the present disclosure. The example shown includes media generation apparatus 200, processor unit 205, memory unit 210, reinforcement learning model 215, media editing application 220, contextual media interface 225, reward network 230, and training component 235. Media generation apparatus 200 is an example of, or includes aspects of, the corresponding element described with reference to FIG. 1.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, the memory controller is integrated into processor unit 205. In some cases, processor unit 205 is configured to execute computer-readable instructions stored in memory unit 210 to perform various functions. In some embodiments, processor unit 205 includes special-purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, reinforcement learning model 215 obtains a media object and context data describing a context of the media object, where the media object includes one or more modification parameters. In some examples, reinforcement learning model 215 generates a modified media object by adjusting the one or more modification parameters based on the context data. In some aspects, the context includes a graphical user interface. In some aspects, the context data includes at least one of a background color, a font style, or a font color of the graphical user interface. In some aspects, the one or more modification parameters includes a contrast, a hue, and a brightness of the media object.

In some examples, reinforcement learning model 215 receives feedback based on the modified media object. In some examples, reinforcement learning model 215 computes a reward value based on the feedback. In some examples, reinforcement learning model 215 updates reinforcement learning model 215 based on the reward value. In some examples, reinforcement learning model 215 generates a subsequent modified media object using the updated reinforcement learning model 215.

In some examples, reinforcement learning model 215 generates state information for the media object based on features of the media object, where the modified media object is generated based on the state information. In some aspects, the state information includes a previous action of the reinforcement learning model 215. In some examples, reinforcement learning model 215 selects an action from an action set corresponding to potential values of the one or more modification parameters using the reinforcement learning model 215, where the modified media object is generated by applying the action to the media object using media editing application 220.

According to some aspects, reinforcement learning model 215 obtains a media object and context data describing a context of the media object, where the media object includes one or more modification parameters. In some examples, reinforcement learning model 215 generates a modified media object by adjusting the one or more modification parameters using a reinforcement learning model 215 based on the context data. In some examples, reinforcement learning model 215 computes a reward value on the modified media object. In some examples, reinforcement learning model 215 updates parameters of reinforcement learning model 215 based on the reward value.

In some examples, reinforcement learning model 215 computes a static reward based on features of the media object, where the reward value includes the static reward. In some examples, reinforcement learning model 215 identifies an acceptable range for the features of the media object.

According to some aspects, reinforcement learning model 215 obtains a media object and context data describing a context of the media object, where the media object includes one or more modification parameters. In some examples, reinforcement learning model 215 selects an action for modifying the one or more modification parameters based on the context data.

According to some aspects, reinforcement learning model 215 comprises one or more artificial neutral networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, reinforcement learning model 215 comprises an agent, an environment, or a combination thereof. In some cases, reinforcement learning model is implemented as hardware, as firmware, as software stored in memory unit 210 and executed by processor 205, or as a combination thereof. Reinforcement learning model 215 is an example of, or includes aspects of, the corresponding element described with reference to FIGS. 3 and 4.

According to some aspects, media editing application 220 generates a modified media object by adjusting the one or more modification parameters based on the action. According to some aspects, media editing application 220 is further comprised in reinforcement learning model 215. According to some aspects, media editing application 220 is implemented in an environment of reinforcement learning model 215.

In some cases, media editing application 220 is implemented as hardware, as firmware, as software stored in memory unit 210 and executed by processor 205, or as a combination thereof. Media editing application 220 is an example of, or includes aspects of, the corresponding element described with reference to FIGS. 4 and 9.

According to some aspects, contextual media interface 225 provides the modified media object within the context. According to some aspects, contextual media interface 225 receives instructor feedback based on the modified media object. In some examples, contextual media interface 225 includes in a dataset a first trajectory corresponding to the modified media object, a second trajectory corresponding to the additional modified media object, and the instructor feedback.

According to some aspects, contextual media interface 225 is configured to display the modified media object within the context. In some cases, contextual media interface 225 is implemented as a graphical user interface. According to some aspects, contextual media interface 225 is provided on a user device (such as described with reference to FIG. 1) by media generation apparatus 200. In some cases, contextual media interface 225 is implemented as software stored in memory unit 210 and executed by processor 205. Contextual media interface 225 is an example of, or includes aspects of, the corresponding element described with reference to FIG. 12.

According to some aspects, reward network 230 computes a dynamic reward based on state information for the media object using a reward network 230, where the reward value includes the dynamic reward. According to some aspects, reward network is further comprised in reinforcement learning model 215. According to some aspects, reward network is implemented in an environment of reinforcement learning model 215.

According to some aspects, reward network 230 comprises one or more ANNs. In some cases, reward network 230 comprises one or more fully connected (FC) layers. According to some aspects, reward network 230 is implemented as hardware, as firmware, as software stored in memory unit 210 and executed by processor 205, or as a combination thereof. Reward network 230 is an example of, or includes aspects of, the corresponding element described with reference to FIG. 15.

According to some aspects, training component 235 computes a dynamic reward loss based on the instructor feedback. In some examples, training component 235 updates parameters of the reward network 230 based on the dynamic reward loss.

According to some aspects, training component 235 is implemented as hardware, as firmware, as software stored in memory unit 210 and executed by processor 205, or as a combination thereof. According to some aspects, training component 235 is omitted from media generation apparatus 200 and is implemented in a separate apparatus. According to some aspects, training component 235 included in the separate apparatus communicates with media generation apparatus 200 to perform the functions described herein. According to some aspects, training component 235 is implemented in the separate apparatus as hardware, as firmware, as software stored in memory of the separate apparatus and executed by a processor of the separate apparatus, or as a combination thereof. Training component 235 is an example of, or includes aspects of, the corresponding element described with reference to FIG. 15.

Figure 3:
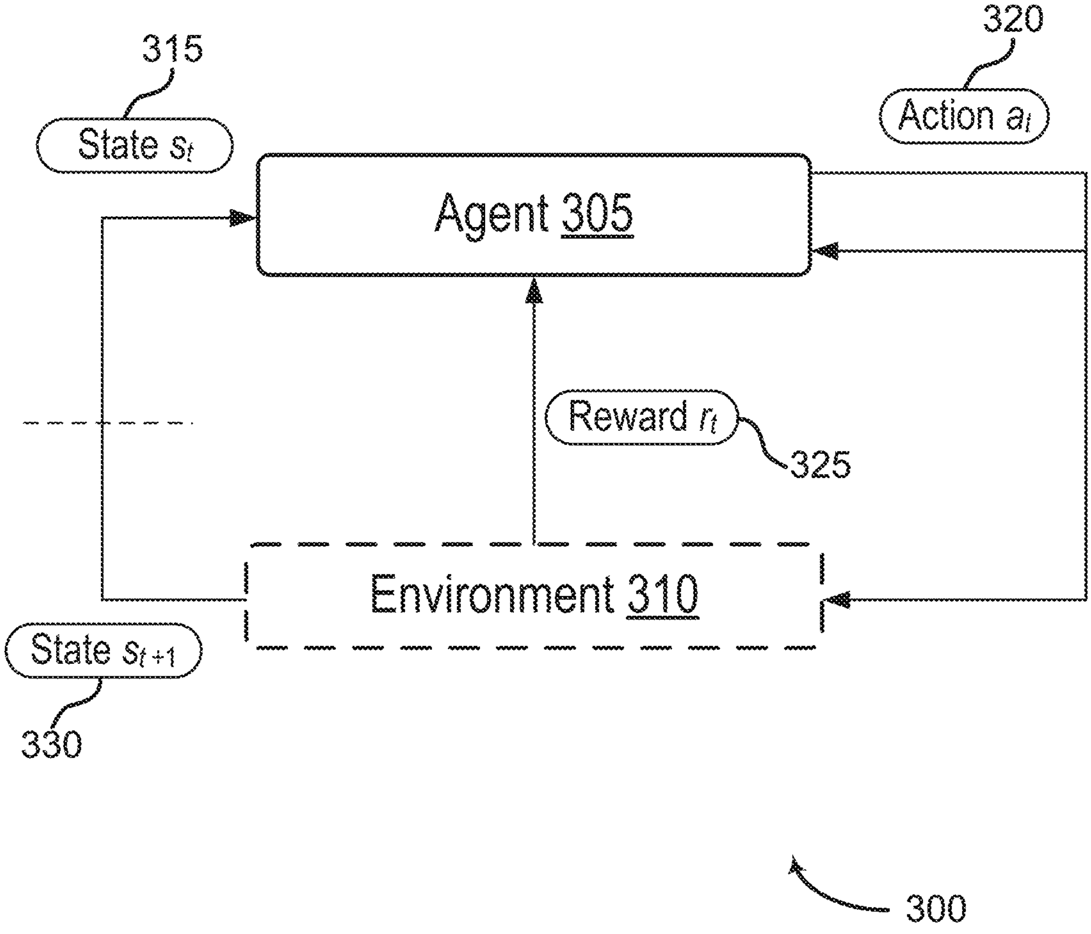
FIG. 3 shows an example of a reinforcement learning model according to aspects of the present disclosure.

FIG. 3 shows an example of a reinforcement learning model 300 according to aspects of the present disclosure. Reinforcement learning model 300 is an example of, or includes aspects of, the corresponding element described with reference to FIGS. 2 and 4. In one aspect, reinforcement learning model 300 includes agent 305, environment 310, first state 315, action 320, reward 325, and next state 330.

Reinforcement learning is one of three basic machine learning paradigms, alongside supervised learning and unsupervised learning. Reinforcement learning differs from supervised learning in that labelled training data is not needed, and errors need not be explicitly corrected. Instead, reinforcement learning can balance exploration of unknown options and exploitation of existing knowledge. Specifically, reinforcement learning relates to how software agents make decisions in order to maximize a reward. In some cases, a strategy for decision making within a reinforcement learning model may be referred to as a policy.

Referring to FIG. 3, in some cases, reinforcement learning model 300 employs reinforcement learning to train agent 305 to perform an action a at a given time interval t within environment 310. For example, at each time interval t, agent 305 receives state 315 (e.g., state $s_t$) and reward 325 (e.g., reward $r_t$) from environment 310 and sends action 320 (e.g., action $a_t$) to environment 310. In some cases, action 320 causes state 315 to advance to next state 330. In some cases, reward 325 is feedback for how successful action 320 is with respect to completing a task goal. In some cases, reward 325 can be immediate or can be delayed.

In some cases, agent 305 comprises a policy and a policy learning algorithm. In some cases, the policy is a mapping from state 315 to a probability distribution of actions to be taken. In some cases, within agent 305, the policy is implemented by a function approximator with tunable parameters. In some cases, the function approximator is implemented as one or more ANNs. In some cases, agent 305 uses the policy learning algorithm to continuously update parameters of the policy based on state 315, action 320, and reward 325. In some cases, agent 305 uses the policy learning algorithm to find an optimal policy that maximizes an expected cumulative long-term reward received during a task.

Agent 305 is an example of, or includes aspects of, the corresponding element described with reference to FIGS. 4 and 5. Environment 310 is an example of, or includes aspects of, the corresponding element described with reference to FIG. 4.

First state 315 is an example of, or includes aspects of, the corresponding element described with reference to FIG. 4. Action 320 is an example of, or includes aspects of, the corresponding element described with reference to FIGS. 4 and 8. Reward 325 is an example of, or includes aspects of, the corresponding element described with reference to FIG. 4. Next state 330 is an example of, or includes aspects of, the corresponding element described with reference to FIG. 4.

Figure 4:
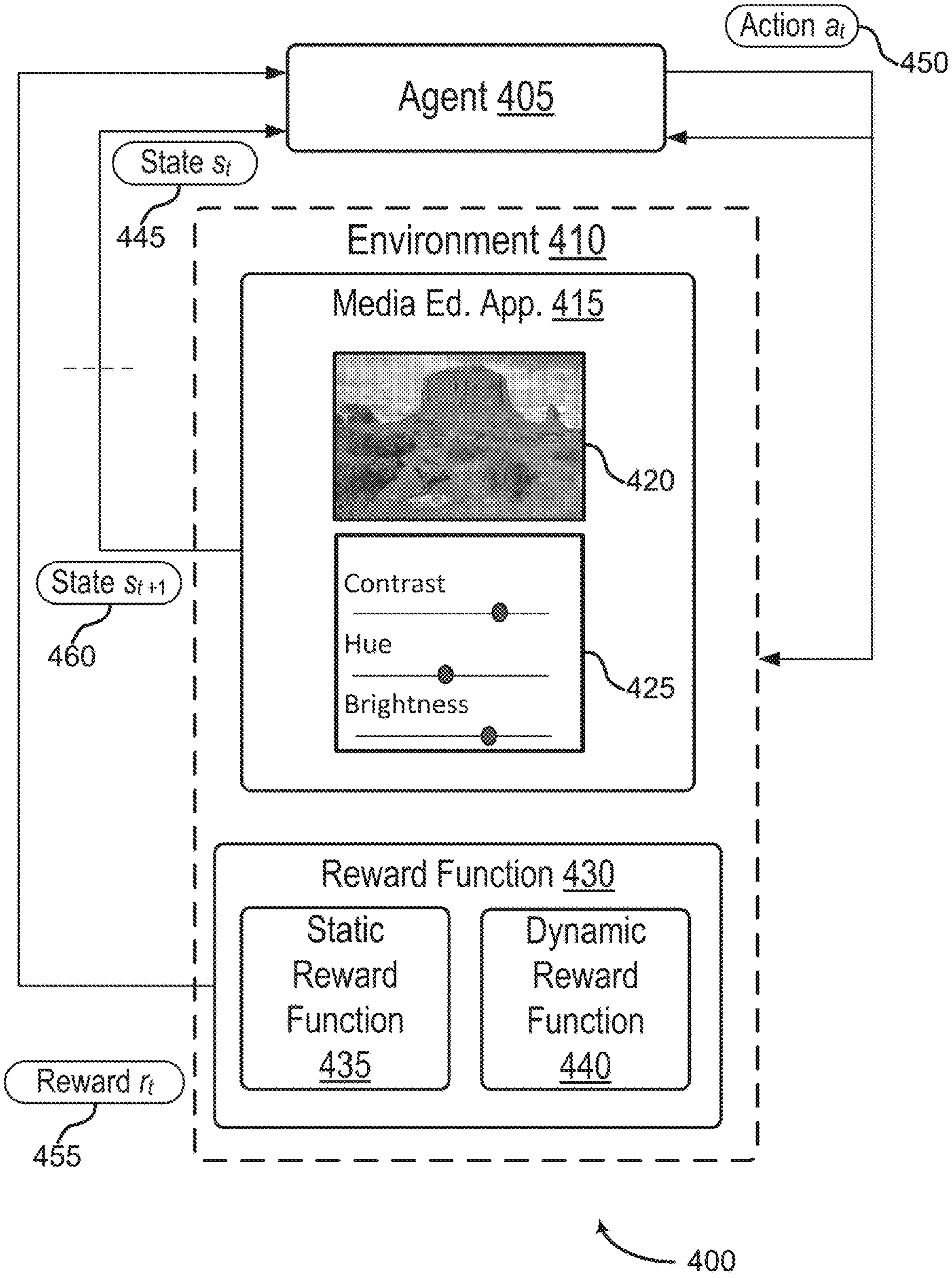
FIG. 4 shows an example of a reinforcement learning architecture according to aspects of the present disclosure.

FIG. 4 shows an example of a reinforcement learning architecture according to aspects of the present disclosure. Reinforcement learning model 400 is an example of, or includes aspects of, the corresponding element described with reference to FIGS. 2 and 3. In one aspect, reinforcement learning model 400 includes agent 405, environment 410, first state 445, action 450, reward 455, and next state 460. In one aspect, environment 410 includes media editing application 415, modified media object 420, modification parameters 425 and reward function 430. In one aspect, reward function 430 includes static reward function 435 and dynamic reward function 440.

Agent 405 is an example of, or includes aspects of, the corresponding element described with reference to FIGS. 3 and 5. Environment 410 is an example of, or includes aspects of, the corresponding element described with reference to FIG. 3.

FIG. 4 shows an implementation of reinforcement learning model 400 in further detail. For example, at time t, agent 405 receives state 445 (e.g., state $s_t$) and reward 455 (e.g., reward $r_t$) and performs action 450 (e.g., action $s_t$) in environment 410. In response to action 450, state 445 transitions to next state 460 (e.g., state $s_{t+1}$).

In some cases, at time t, state 445 comprises a media object $f_t$, a previous action $a_{t-1}$ at a previous time t−1, and context vector c. In some cases, context vector c is a vector representation of context data. In some cases, the context data includes a background color, a font style, a font color, or a combination thereof. In some cases, the context is a graphical user interface (such as a website, a software application display, etc.).

In some cases, agent instructs media editing application 415 via action 450 to modify the media object $f_t$ to obtain modified media object 420 by adjusting one or more modification parameters 425. In the example shown by FIG. 4, modified media object 420 comprises an image. In the example shown by FIG. 4, modification parameters 425 comprise a contrast, a hue, and a brightness of modified media object 420. In some cases, in response to the adjustment of modification parameters 425, state 445 transitions to next state 460 (e.g., state $s_{t+1}$). Accordingly, in some cases, state 445 comprises media object $f_t$ and next state 460 comprises modified media object 420. In some cases, environment 410 is a continuous environment because the options for action 450 are continuous rather than discrete.

In some cases, reward function 430 computes a reward based on action 450 and state 445 using static reward function 435, dynamic reward function 440, or a combination thereof. In some cases, a reward 455 based on static reward function 435 positively reinforces agent 405 when modified media object 420 retains the content of media object $f_t$ and negatively reinforces agent 405 when modified media object 420 does not retain the content of media object $f_t$, as described with reference to FIG. 10. In some cases, a reward 455 based on dynamic reward function 440 reinforces agent 405 to a degree corresponding to a degree to which a human observer would think modified media object 420 is appropriate for the context (as determined corresponding to the context data c). In some cases, dynamic reward function 440 is implemented as a dynamic reward network as described with reference to FIGS. 3 and 15.

Media editing application 415 is an example of, or includes aspects of, the corresponding element described with reference to FIGS. 2 and 8. Modified media object 420 is an example of, or includes aspects of, the corresponding element described with reference to FIG. 15.

Reward function 430 is an example of, or includes aspects of, the corresponding element described with reference to FIG. 10. Static reward function 435 is an example of, or includes aspects of, the corresponding element described with reference to FIG. 10.

First state 445 is an example of, or includes aspects of, the corresponding element described with reference to FIG. 3. Action 450 is an example of, or includes aspects of, the corresponding element described with reference to FIGS. 3 and 8. Reward 455 is an example of, or includes aspects of, the corresponding element described with reference to FIG. 3. Next state 460 is an example of, or includes aspects of, the corresponding element described with reference to FIG. 3.

FIG. 5 shows an example of an agent 500 according to aspects of the present disclosure. Agent 500 is an example of, or includes aspects of, the corresponding element described with reference to FIGS. 3 and 4. In one aspect, agent 500 includes actor network 505, critic network 510, target actor network 515, and target critic network 520.

Referring to FIG. 5, in some cases, agent 500 is implemented as a deep deterministic policy gradient (DDPG) agent. In some cases, a DDPG agent is a model-free (e.g., does not use a transition possibility distribution and a reward function associated with a Markov decision process, i.e., a model), off-policy agent that uses Q-learning.

Q-learning is a model-free reinforcement learning algorithm that learns a function for determining an action that an agent should take given a current state of its environment. Q-learning does not require a model of the environment, and can handle problems with stochastic transitions and rewards. The "Q" refers to a quality function that returns the reward based on the action taken, and therefore is used to provide the reinforcement. In some examples, at each time period during training a Q-learning network, an agent selects an action, observes a reward, enters a new state, and updates the quality function Q according to a weighted average of the old value and the new observation.

In some cases, an off-policy agent comprises an update policy (e.g., a policy that directs how an agent images it will act when calculating a value of a state-action pair) that is different than a behavior policy (e.g., a policy that directs how an agent will act in any given state). For example, in some cases, an off policy agent can comprise a greedy update policy (e.g., a policy that directs an agent to consistently perform an action that would yield a highest long-term expected reward) and an epsilon-greedy behavior policy (e.g., a policy that does not direct an agent to consistently perform an action that would yield a highest expected reward, but instead sometimes directs a semi-random action). In contrast, in an on-policy agent, both the update policy and the behavior policy are the same.

In some cases, a DDPG agent is an actor-critic reinforcement learning agent that searches for an optimal policy that maximizes an expected cumulative long-term reward. As used herein, an "actor network" can refer to an ANN that returns, for a given state, an action, where the action often maximizes a predicted discount cumulative long-term reward. As used herein, a "critic network" can refer to an ANN that returns, for a given state and action, a predicted discounted value of the cumulative long-term reward. As used herein, "discount" refers to a degree of sensitivity to future rewards.

In some cases, agent 500 is implemented as a DDPG agent because the environment described with reference to FIG. 4 is continuous and a deterministic policy learns a best action as a function of a state. Furthermore, in some cases, because a DDPG agent is model-free, it is suited to a continuous environment, for which a task of determining an accurate model is non-trivial.

A DDPG agent is related to a deep Q network (DQN). Certain Q-learning systems use a deep convolutional neural network (CNN), with layers of tiled convolutional filters to mimic effects of receptive fields. A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some cases, reinforcement learning can be unstable or divergent when a nonlinear function approximator such as a neural network is used to represent Q. This instability is based on correlations present in the sequence of observations. For example, small updates to Q may significantly change a policy, a data distribution, and correlations between Q and target values. Thus, DQN techniques may utilize experience replay, a biologically inspired mechanism that uses a random sample of prior actions instead of the most recent action to proceed. This reduces correlations in the observation sequence and smooths changes in the data distribution.

Iterative updates adjust Q towards target values that are only periodically updated, further reducing correlations with the target. In some examples, DQN models also utilize a target network to fix parameters of the target function. In some examples, a clipping reward technique is used to replace all positive rewards with a same value, and all negative rewards with a different value. In some examples, a skipping frames technique is used to calculate a Q value at periodic intervals to reduce computational cost.

In some cases, a DDPG agent is based on a DQN agent, but is better suited to handle a continuous environment (such as the environment described with reference to FIG. 4). For example, in some cases, agent 500 implements target actor network 515 and target critic network 520 to respectively stabilize a learning process for actor network 505 and critic network 510, as target actor network 515 and target critic network 520 can efficiently deal with non-stationary target values. For example, in some cases, target actor network 515 (e.g., target actor network $\mu'(s', \theta')$, parameterized by $\theta'$) is a time-delayed copy of actor network 505 (e.g., target actor network $\mu(s, \theta)$, parameterized by $\theta$), target critic network 520 (e.g., target critic network $Q'(s', a', w')$, parameterized by $w'$) is a time-delayed copy of actor network 505 (e.g., target actor network $Q(s, a, w)$, parameterized by $w$), and therefore update equations of actor network 505 and critic network 510 are not interdependent on values calculated by actor network 505 and critic network 510, which helps to mitigate divergence in agent 500.

In some cases, each of actor network 505, critic network 510, target actor network 515, and target critic network 520 comprises one or more ANNs. In some cases, the quality function Q is implemented as critic network 520.

In some cases, agent 500 uses a replay buffer to sample experiences to update parameters of actor network 505, critic network 510, target actor network 515, and target critic network 520. For example, during each state-action trajectory roll-out in agent 500, each experience tuple (e.g., comprising a state, an action, a reward, and a next state) is stored in the replay buffer (e.g., a finite-sized cache). Then, in some cases, agent 500 samples random mini-batches of experience from the replay buffer when actor network 505 and critic network 510 are updated. In some cases, agent 500 is therefore relatively more efficient in sampling than an on-policy agent.

Media Generation

A method for media generation is described with reference to FIGS. 6-12. One or more aspects of the method include obtaining a media object and context data describing a context of the media object, wherein the media object comprises one or more modification parameters; generating a modified media object by adjusting the one or more modification parameters using a reinforcement learning model based on the context data; and providing the modified media object within the context.

In some aspects, the context comprises a graphical user interface. In some aspects, the context data includes at least one of a background color, a font style, or a font color of the graphical user interface. In some aspects, the one or more modification parameters includes a contrast, a hue, and a brightness of the media object.

Some examples of the method further include receiving feedback based on the modified media object. Some examples further include computing a reward value based on the feedback. Some examples further include updating the reinforcement learning model based on the reward value. Some examples of the method further include generating a subsequent modified media object using the updated reinforcement learning model.

Some examples of the method further include generating state information for the media object based on features of the media object, wherein the modified media object is generated based on the state information. In some aspects, the state information includes a previous action of the reinforcement learning model. Some examples of the method further include selecting an action from an action set corresponding to potential values of the one or more modification parameters using the reinforcement learning model, wherein the modified media object is generated by applying the action to the media object using a media editing application.

FIG. 6 shows an example of a method 600 for modifying a media object for a context according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, a media generation system as described with reference to FIG. 1 generates a modified media object for a user based on an original media object and a context, such that the modified media object is appropriate for inclusion in the context.

At operation 605, the system provides a media object and a context for the media object. In some cases, the operations of this step refer to, or may be performed by, a user as described with reference to FIG. 1. In the example of FIG. 6, the example media object is an image and the context is a website. In some cases, the user provides the media object and the context to the media generation system via a user interface provided by the media generation system on a user device. In some cases, the user interface is a contextual media user interface as described with reference to FIGS. 2 and 12.

In some cases, the user provides the context as context data (for example, in the case of the website, by providing HTML code corresponding to the context, or by identifying the context data in the user interface), as context data within a set of data (for example, full code for the website) or as a representation of the context (for example, as an image or other representation of the website). In some cases, the image generation system obtains the context data based on the set of data (for example, by identifying and extracting the context data from the set of data) or the representation of the context (for example, by analyzing the representation of the context and generating the context data based on the analysis).

At operation 610, the system generates a modified media object by optimizing a characteristic of the media object for the context. In some cases, the operations of this step refer to, or may be performed by, a media generation apparatus as described with reference to FIGS. 1 and 2. For example, in some cases, the media generation apparatus generates the modified media object using a reinforcement learning model to adjust modification parameters of the media object as described with reference to FIGS. 7-16.

At operation 615, the system displays the modified media object in the context. In some cases, the operations of this step refer to, or may be performed by, a media generation apparatus as described with reference to FIGS. 1 and 2. For example, in some cases, the media generation apparatus displays the modified media object in a contextual media user interface as described with reference to FIGS. 7 and 12.

Figure 7:
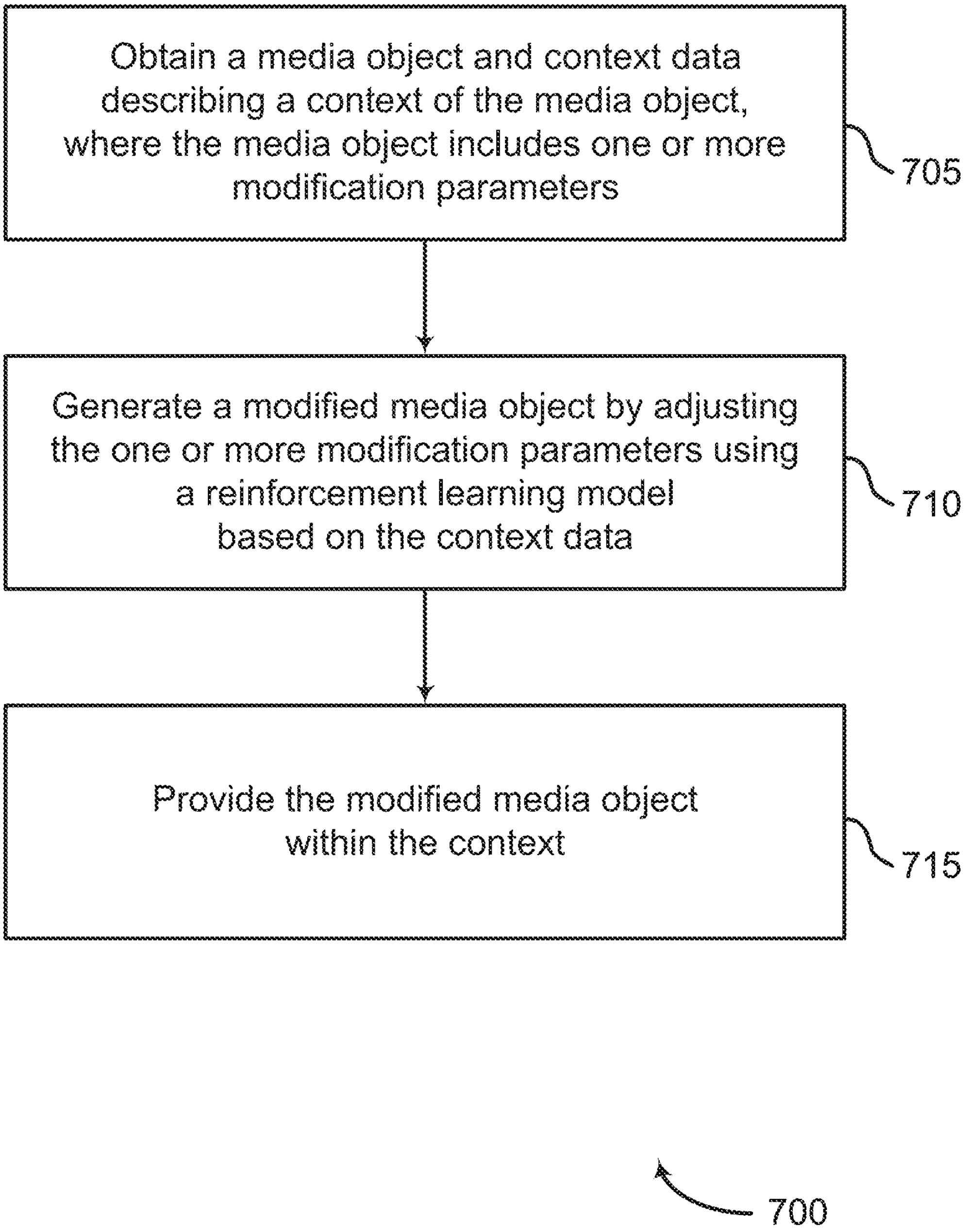
FIG. 7 shows an example of a method for generating a modified media object according to aspects of the present disclosure.

FIG. 7 shows an example of a method 700 for generating a modified media object according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, a media generation apparatus (such as the media generation apparatus described with reference to FIGS. 1 and 2) uses a reinforcement learning model (such as the reinforcement learning model described with reference to FIGS. 2-4) to generate a modified media object for a context. In some cases, the reinforcement learning model accordingly modifies the media object using a sequence of actions such that, after modification, content of the media object is preserved in the modified media object, and the modified media object is appropriate for the context.

As used herein, a "media object" refers to any media content, such as an image, a video, text, audio, etc. As used herein, "context" refers to a surrounding of the media object within which the media object is observed or perceived. In some cases, a context includes a graphical user interface. In some cases, a context comprises context data. As used herein, "context data" refers to a numerical representation of the context. In some cases, context data comprises a context vector. In some cases, a "modified media object" refers to a media object comprising one or more modification parameter values that are different from a value for corresponding modification parameters comprised in an original media object. As used herein, a "modification parameter" refers to a representation of a feature of a media object.

At operation 705, the system obtains a media object and context data describing a context of the media object, where the media object includes one or more modification parameters. In some cases, the operations of this step refer to, or may be performed by, a reinforcement learning model as described with reference to FIGS. 2-4.

For example, in some cases, the reinforcement learning model obtains the media object from a user via a user device (such as the user and user device described with reference to FIG. 1). In some cases, the media object is an image. In some cases, the reinforcement learning model obtains context data describing the context of the media object from the user, from a database (such as the database described with reference to FIG. 1), or from another data source. In some cases, the context comprises a graphical user interface. In some cases, the context data comprises at least one of a background color, a font style, or a font color of the graphical user interface.

In some cases, the reinforcement learning model directly obtains the context data. In some cases, the media generation apparatus extracts the context data from other data and provides the context data to the reinforcement learning model.

At operation 710, the system generates a modified media object by adjusting the one or more modification parameters using a reinforcement learning model based on the context data. In some cases, the operations of this step refer to, or may be performed by, a reinforcement learning model as described with reference to FIGS. 2-4.

For example, in some cases, at a time t, an agent of the reinforcement learning model (such as the agent described with reference to FIGS. 3-5) takes an action at in an environment (such as the environment described with reference to FIGS. 3-5). In some cases, action at includes an adjustment of the one or more modification parameters within a media editing application (such as the media editing application described with reference to FIG. 4). In some cases, action at includes an instruction to the media editing application to adjust the one or more modification parameters. In some cases, the one or more modification parameters comprise information corresponding to a feature of the media object. In some cases, the one or more modification parameters comprises a contrast, a hue, and a brightness of the media object. In some cases, the reinforcement learning model selects action at from an action set corresponding to potential values of the one or more modification parameters. An action at is described with reference to FIG. 8.

In some cases, at the time t, the reinforcement learning model generates state information (e.g., state $s_t$) for a media object $f_t$ based on features of the media object $f_t$. For example, in some cases, the state $s_t$ is a vector comprising the media object $f_t$, a previous action media object $a_{t-1}$, and the context data media object c. In some cases, an initial action is generated as described with reference to FIG. 11. In some cases, the modified media object is generated based on the state information. For example, when the one or more modification parameters are adjusted in response to an action at, a modified media object comprising the one or more adjusted modification parameters is generated, and the state information transitions from state $s_t$ to a next state $s_{t+1}$. According to some aspects, the reinforcement learning model is updated based on a reward as described with reference to FIG. 9.

At operation 715, the system provides the modified media object within the context. In some cases, the operations of this step refer to, or may be performed by, a contextual media interface as described with reference to FIGS. 2 and 12. In some cases, the contextual media interface is a graphical user interface. An example of a contextual media interface is described with reference to FIG. 12.

Figure 8:
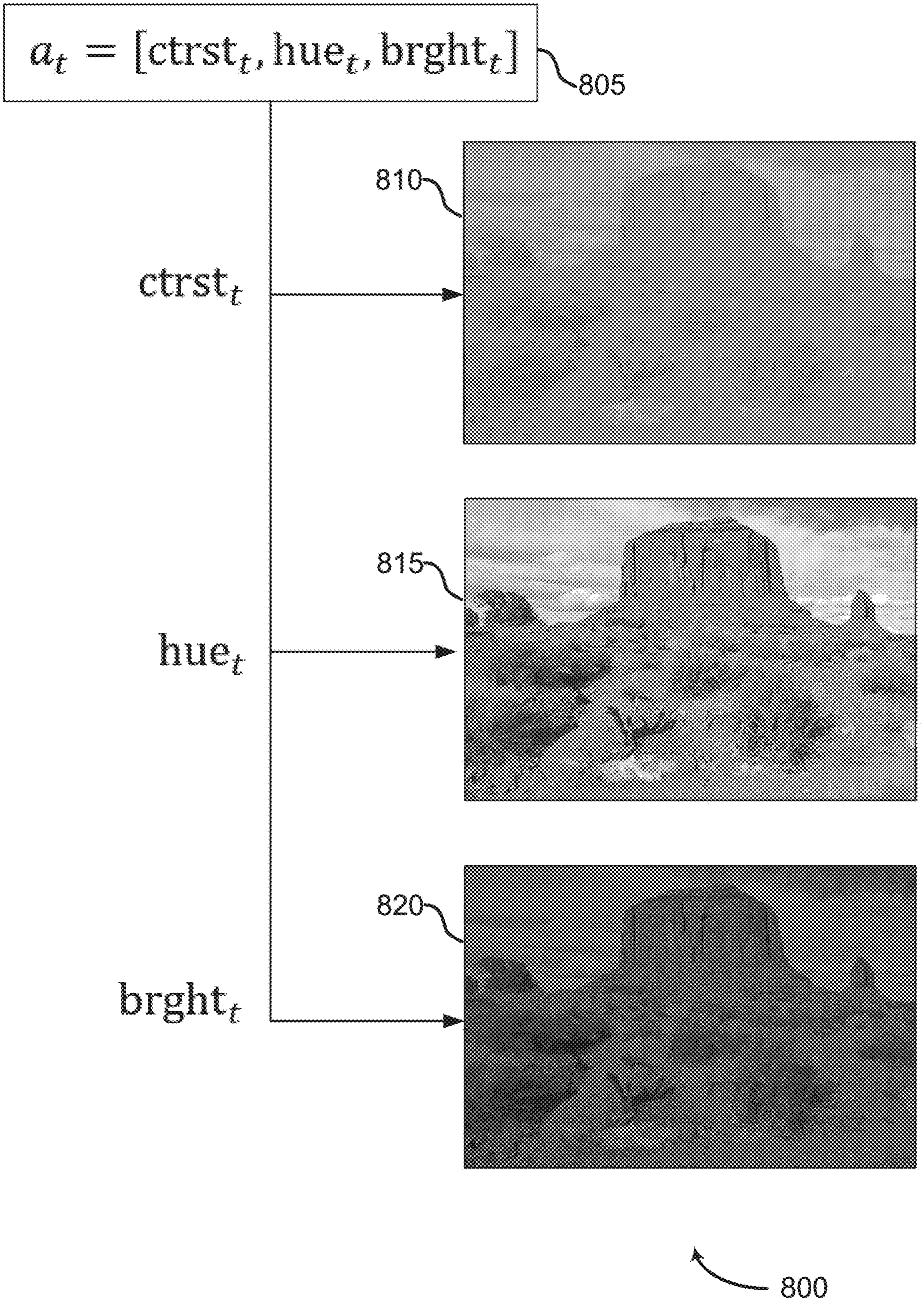
FIG. 8 shows an example of an action with respect to a media object according to aspects of the present disclosure.

FIG. 8 shows an example of an action with respect to a media object according to aspects of the present disclosure. The example shown includes media editing application 800, action 805, first example modification 810, second example modification 815, and third example modification 820. Media editing application 800 is an example of, or includes aspects of, the corresponding element described with reference to FIGS. 2 and 4. Action 805 is an example of, or includes aspects of, the corresponding element described with reference to FIGS. 3 and 4.

Referring to FIG. 8, an agent (such as the agent described with reference to FIGS. 3-5) takes action 805 at time t within media editing application 800 by adjusting (or instructing media editing application 800 to adjust) one or more modification parameters for a media object. In the example of FIG. 8, the media object comprises an image, and the one or more modification parameters comprises a contrast, a hue, and a brightness. Accordingly, action 805 is a vector $a_t$= [$ctrs_t$, $hue_t$, $brgh_t$], and values of the modification parameters of the contrast, the hue, and the brightness are adjusted according to action 805. First example modification 810 is a representation of a modified media object that is generated by adjusting a contrast of a media object to a low value. Second example modification 815 and third example modification 820 are similar representations respectively corresponding to a hue and a contrast of the modified media object.

Figure 9:
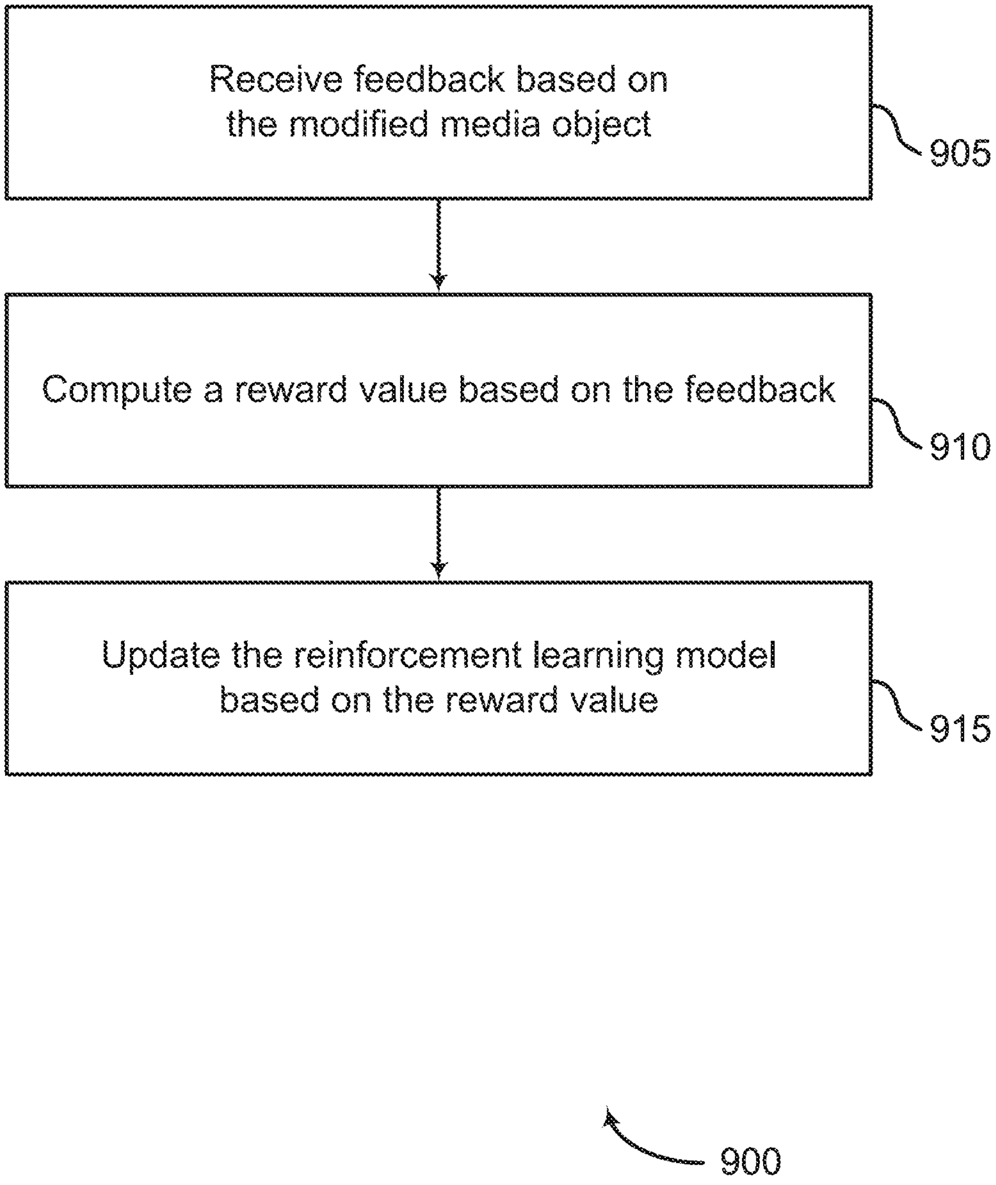
FIG. 9 shows an example of a method for computing a reward value according to aspects of the present disclosure.

FIG. 9 shows an example of a method 900 for computing a reward value according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives feedback based on the modified media object. In some cases, the operations of this step refer to, or may be performed by, a reinforcement learning model as described with reference to FIGS. 2-4. For example, in some cases, a reward function (such as the reward function described with reference to FIG. 4) process the modified media object to determine feedback for the modified media object. In some cases, a static reward function (such as the static reward function described with reference to FIG. 4) determines if the modified media object retains content of the media object as described with reference to FIG. 10, and provides feedback accordingly. In some cases, a dynamic reward function (such as the dynamic reward function) determines, based on the action and the state, if the modified media object is appropriate for the context (e.g., would be preferred by a human user for the context), and provides feedback accordingly. In some cases, the dynamic reward function is trained as described with reference to FIG. 15.

At operation 910, the system computes a reward value based on the feedback. In some cases, the operations of this step refer to, or may be performed by, a reinforcement learning model as described with reference to FIGS. 2-4. For example, in some cases, the reinforcement learning model computes a reward r (such as the reward described with reference to FIGS. 3-4) (e.g., a reward value) based on the feedback. In some cases, the reward r comprises a static reward $r_0$ based on the feedback from the static reward function. In some cases, the reward r comprises a dynamic reward $r_\phi$ based on the feedback from the dynamic reward function. In some cases, the reward is based on a state and an action. In some cases, therefore, $r=r_0+r_\phi$.

In some cases, the feedback comprises instructor feedback as described with reference to FIGS. 14-15.

At operation 915, the system updates the reinforcement learning model based on the reward value. In some cases, the operations of this step refer to, or may be performed by, a reinforcement learning model as described with reference to FIGS. 2-4. For example, in some cases, an agent (such as an agent described with reference to FIGS. 2-5) updates parameters of one or more ANNs comprised in the agent using a loss function. A "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

In some cases, the agent updates parameters of a critic network (such as the critic network described with reference to FIG. 5) using a critic loss $$\mathcal{L}_{critic}^{DDPG}:$$

$$\mathcal{L}_{critic}^{DDPG} = (r + \gamma Q(s', \mu(s', \theta')w') - Q(s, a, w))^2 \quad (1)$$

In some cases, the agent updates parameters of an actor network (such as the actor network described with reference to FIG. 5) using an actor loss $$\mathcal{L}_{actor}^{DDPG}:$$

$$\mathcal{L}_{actor}^{DDPG} = \nabla_a Q(s, a, w)\nabla_\theta \mu(s, \theta) \quad (2)$$

In equation (1), r is the reward and $\gamma$ is a discount factor. Referring to equation (1), next-state Q-values are calculated using a target critic network (such as the target critic network described with reference to FIG. 5) and a target actor network (such as the target actor network described with reference to FIG. 5).

In some cases, the agent updates the target actor network according to $\theta'=\tau\theta+(1-\tau)\theta'$ and the target critic network according to $w'=\tau w+(1-\tau)w'$, where $\tau<<1$.

According to some aspects, the reinforcement learning model generates a subsequent modified media object based on the updated parameters. For example, based on a next state (such as the next state described with reference to FIGS. 3-4), the agent takes a next action based on the updated actor network and the updated critic network to generate the subsequent modified media object (or instruct the media editing apparatus to generate the subsequent modified media object) by adjusting modification parameters of the modified media object. In some cases, the reinforcement learning model provides the subsequent modified media object within the context via the contextual media interface.

Figure 10:
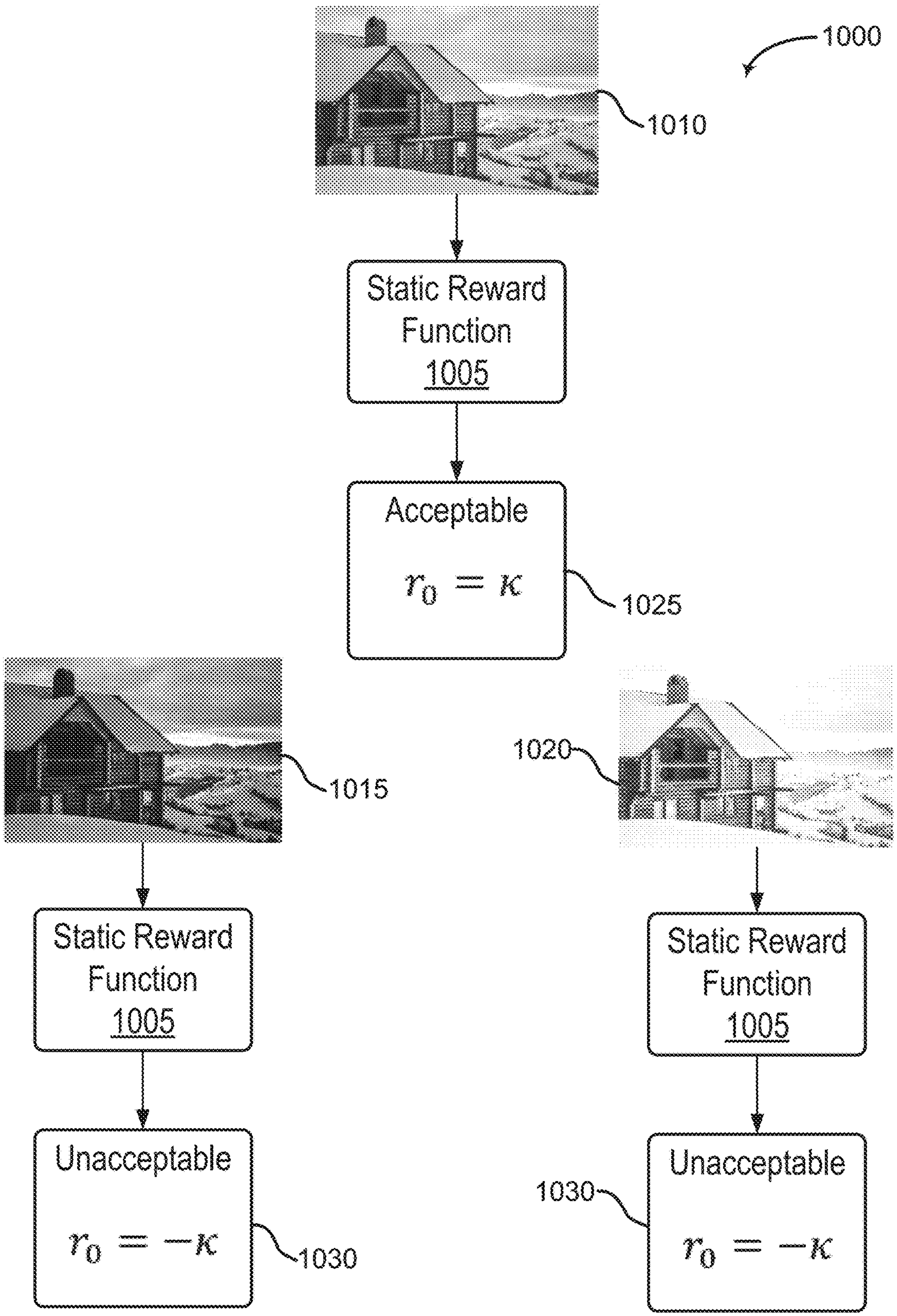
FIG. 10 shows an example of computing a static reward value according to aspects of the present disclosure.

FIG. 10 shows an example of computing a static reward value according to aspects of the present disclosure. The example shown includes reward function 1000, static reward function 1005, first modified media object 1010, second modified media object 1015, third modified media object 1020, first static reward value 1025, and second static reward value 1030.

Reward function 1000 is an example of, or includes aspects of, the corresponding element described with reference to FIG. 4. In one aspect, reward function 1000 includes static reward function 1005. Static reward function 1005 is an example of, or includes aspects of, the corresponding element described with reference to FIG. 4.

Referring to FIG. 10, reward function 1000 uses static reward function 1005 to provide feedback for a modified media object. For example, static reward function 1005 receives a modified media object and determines if features of the modified media object are within an acceptable range for the features. In some cases, if the features of the modified media object are within the acceptable range, static reward function 1005 provides positive feedback, and reward function 1000 determines that the static reward $r_0=\kappa$. In some cases, if the features of the modified media object are not within the acceptable range, static reward function 1005 provides negative feedback, and reward function 1000 determines that the static reward $r_0=-\kappa$.

In some cases, acceptable features for a modified media object implemented as an image may relate to pixel colors of the modified media object. For example, an image may be generated such that a combination of a brightness, a hue, and a contrast of the image (e.g., features of the image corresponding to modification parameters) causes the image to appear "overexposed" (e.g., $|255-\text{Avg(image pixel colors)}|>180$) or "underexposed" (e.g., $|255-\text{Avg(image pixel colors)}|<30$), and thus having features that are outside the acceptable range.

In the example of FIG. 10, static reward function 1005 determines that first modified media object 1010 has features within the range of acceptable parameters because first modified media object 1010 satisfies $30<|255-\text{Avg(image pixel colors)}|<180$. Based on this feedback, reward function 1000 determines first static reward value 1025 (e.g., $r_0=\kappa$). Likewise, static reward function 1005 determines that second modified media object 1015 is underexposed because second media object 1015 does not satisfy $|255-\text{Avg(image pixel colors)}|>30$ and third modified media object 1020 is overexposed because third media object 1020 does not satisfy $|255-\text{Avg(image pixel colors}|<180$. Based on this feedback, reward function 1000 determines second static reward value 1030 (e.g., $r_0=-\kappa$).

Accordingly, by determining the static reward $r_0$, the reward function reinforces the reinforcement learning model to generate a modified media object that retains content of the media object.

FIG. 11 shows an example of an algorithm 1100 for initializing a reinforcement learning model according to aspects of the present disclosure. Referring to FIG. 11, algorithm 1100 is pseudocode for producing trajectories conditioned by a static reward function $r_0$ (such as the static reward function described with reference to FIGS. 7 and 10). As used herein, a "trajectory" refers to a sequence of states and actions. For example, a trajectory $\sigma_i=\{(s_{i1}, a_{i1}), \ldots (s_{ij}, a_{ij}\}$. In some cases, the parameters of $Q_w$ and $\pi_\psi$ are randomly initialized. In some cases, $\pi_\psi$ can be expressed as $\mu_\theta$. In some cases, $$\mathcal{L}_c^{DDPG}$$

refers to the critic loss $$\mathcal{L}_{critic}^{DDPG}$$

described with reference to FIG. 9. In some cases, $$\mathcal{L}_a^{DDPG}$$

refers to the actor loss $$\mathcal{L}_{actor}^{DDPG}$$

described with reference to FIG. 9. In some cases, an initial action is obtained based on the initialized parameters.

Figure 12:
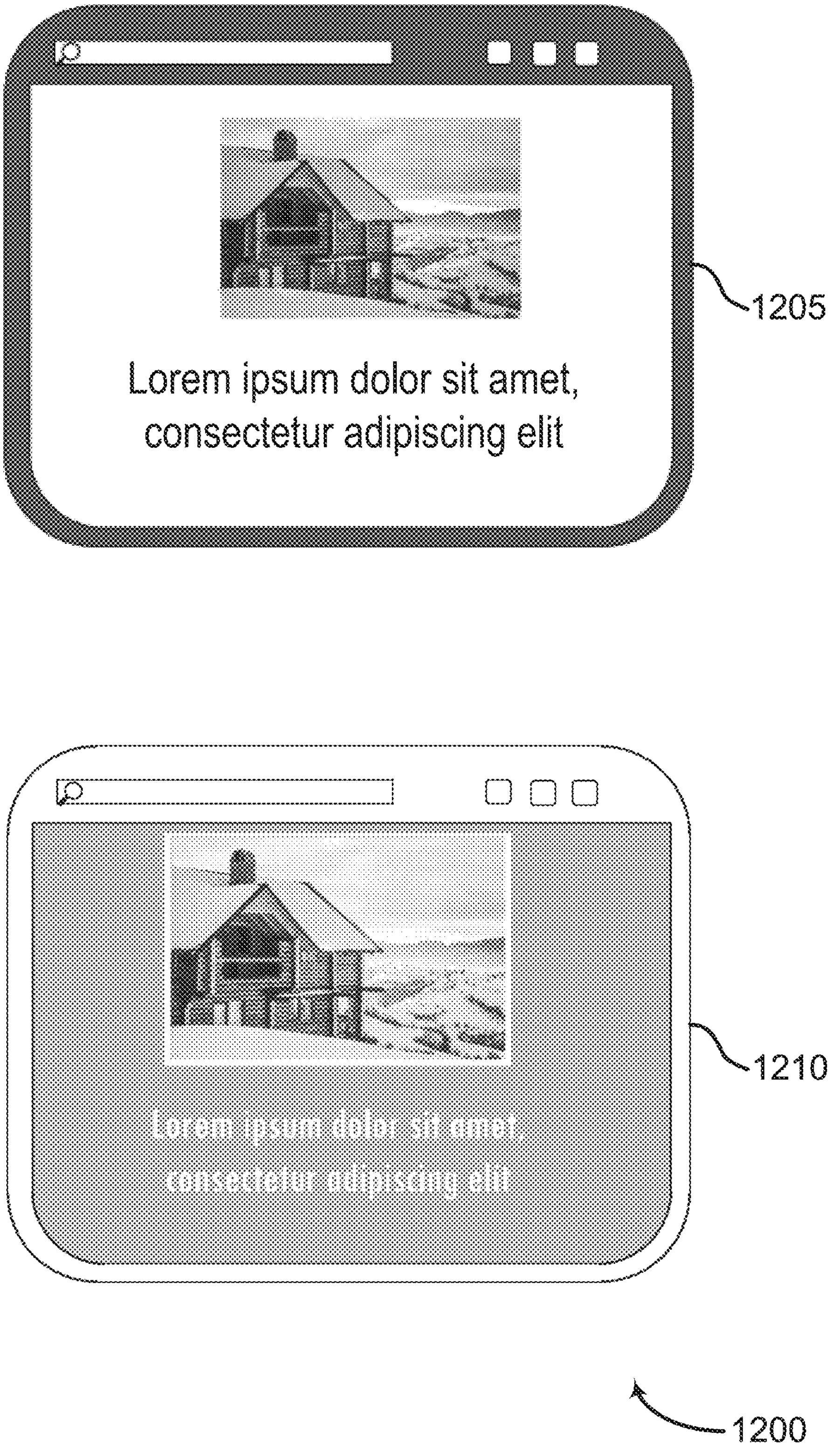
FIG. 12 shows an example of modified media objects in context according to aspects of the present disclosure.

FIG. 12 shows an example of modified media objects in context according to aspects of the present disclosure. The example shown includes contextual media interface 1200, first modified media object representation 1205, and second modified media object representation 1210. Contextual media interface 1200 is an example of, or includes aspects of, the corresponding element described with reference to FIG. 2.

Referring to FIG. 12, contextual media interface 1200 displays first modified media object representation 1205 and second modified media object representation 1210. First modified media object representation 1205 is a depiction of a first modified media object in a first context, and second modified media object representation 1210 is a depiction of a second modified media object in a second context. In some cases, the first modified media object 1205 and the second modified media object 1210 are examples of different modified media objects that can be generated based on a same original media object in response to different context data (e.g., a different background color, a different font style, a different font color, or a combination thereof). As shown in FIG. 12, each of the first modified media object and the second modified media object are an image, and each of the first context and the second context are a graphical user interface, specifically a website. In some cases, contextual media interface 1200 is displayed on a user device (such as the user device described with reference to FIG. 1).

Training

A method for media generation is described with reference to FIGS. 13-16. One or more aspects of the method include obtaining a media object and context data describing a context of the media object, wherein the media object comprises one or more modification parameters; generating a modified media object by adjusting the one or more modification parameters using a reinforcement learning model based on the context data; computing a reward value on the modified media object; and updating parameters of the reinforcement learning model based on the reward value.

Some examples of the method further include computing a static reward based on features of the media object, wherein the reward value includes the static reward. Some examples of the method further include identifying an acceptable range for the features of the media object. Some examples further include determining whether the features of the media object are within the acceptable range, wherein the static reward is based on the determination.

Some examples of the method further include computing a dynamic reward based on state information for the media object using a reward network, wherein the reward value includes the dynamic reward. Some examples of the method further include receiving instructor feedback based on the modified media object. Some examples further include computing a dynamic reward loss based on the instructor feedback. Some examples further include updating parameters of the reward network based on the dynamic reward loss.

Some examples of the method further include generating an additional modified media object, wherein the instructor feedback is based on the additional modified media object. Some examples of the method further include including in a dataset a first trajectory corresponding to the modified media object, a second trajectory corresponding to the additional modified media object, and the instructor feedback.

Figure 13:
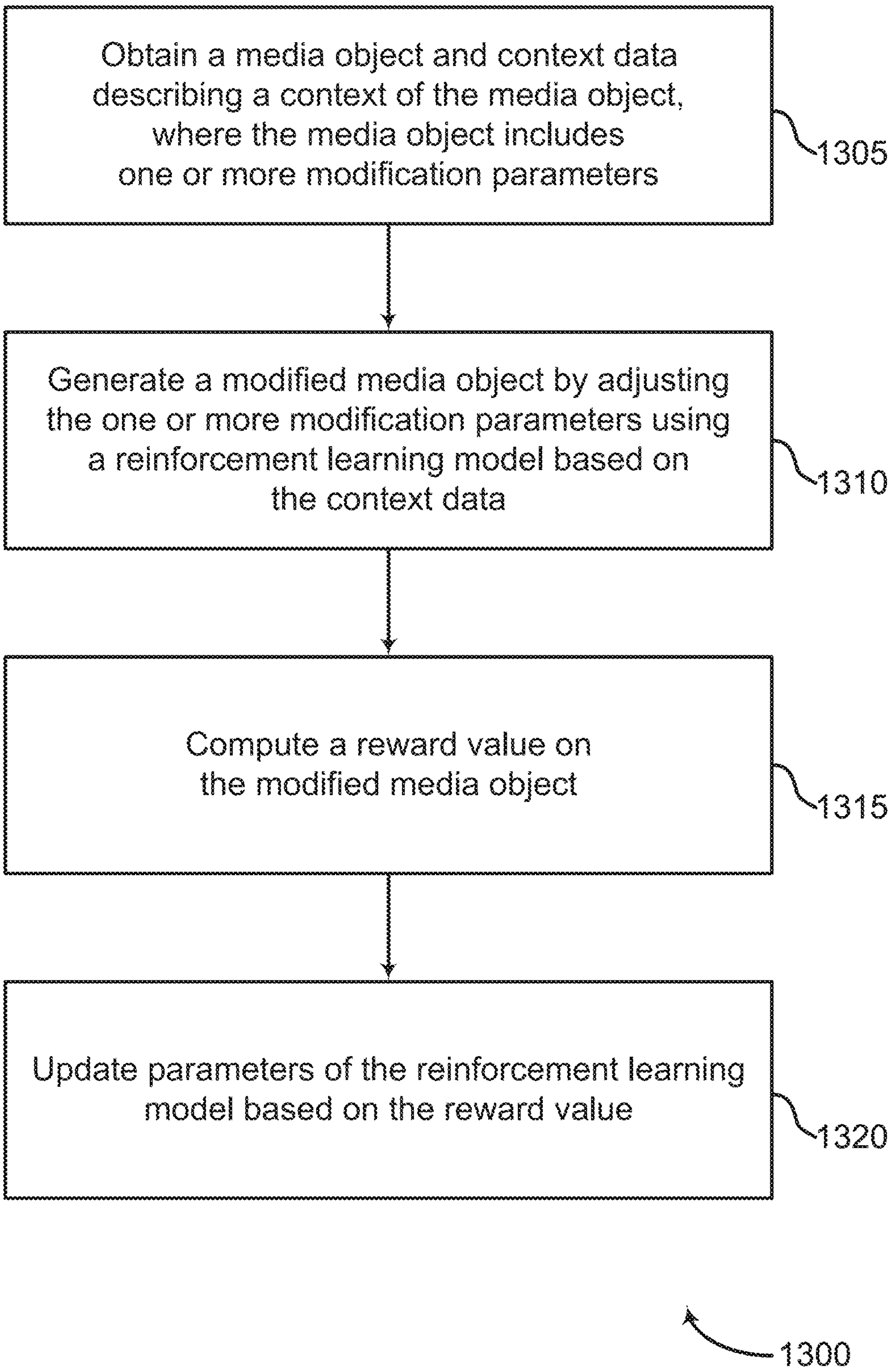
FIG. 13 shows an example of a method for updating a reinforcement learning model according to aspects of the present disclosure.

FIG. 13 shows an example of a method 1300 for updating a reinforcement learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, a media generation apparatus (such as the media generation apparatus described with reference to FIGS. 1 and 2) generates a modified media object using a reinforcement learning model (such as the reinforcement learning model described with reference to FIGS. 2-5) and updates the parameters of the reinforcement learning model based on a reward value.

At operation 1305, the system obtains a media object and context data describing a context of the media object, where the media object includes one or more modification parameters. In some cases, the operations of this step refer to, or may be performed by, a reinforcement learning model as described with reference to FIGS. 2-4. For example, in some cases, the reinforcement learning model obtains the media object and the context data as described with reference to FIG. 7.

At operation 1310, the system generates a modified media object by adjusting the one or more modification parameters using a reinforcement learning model based on the context data. In some cases, the operations of this step refer to, or may be performed by, a reinforcement learning model as described with reference to FIGS. 2-4. For example, in some cases, the reinforcement learning model generates the modified media object as described with reference to FIG. 7.

At operation 1315, the system computes a reward value on the modified media object. In some cases, the operations of this step refer to, or may be performed by, a reinforcement learning model as described with reference to FIGS. 2-4. For example, in some cases, the reinforcement learning model computes the reward value as described with reference to FIG. 7.

At operation 1320, the system updates parameters of the reinforcement learning model based on the reward value. In some cases, the operations of this step refer to, or may be performed by, a reinforcement learning model as described with reference to FIGS. 2-4. For example, in some cases, the reinforcement learning model is updated as described with reference to FIG. 7. In some cases, the parameters of a reward network are updated as described with reference to FIGS. 14-15. An algorithm for updating parameters of a reinforcement learning model based on an updated reward network is described with reference to FIG. 16.

Figure 14:
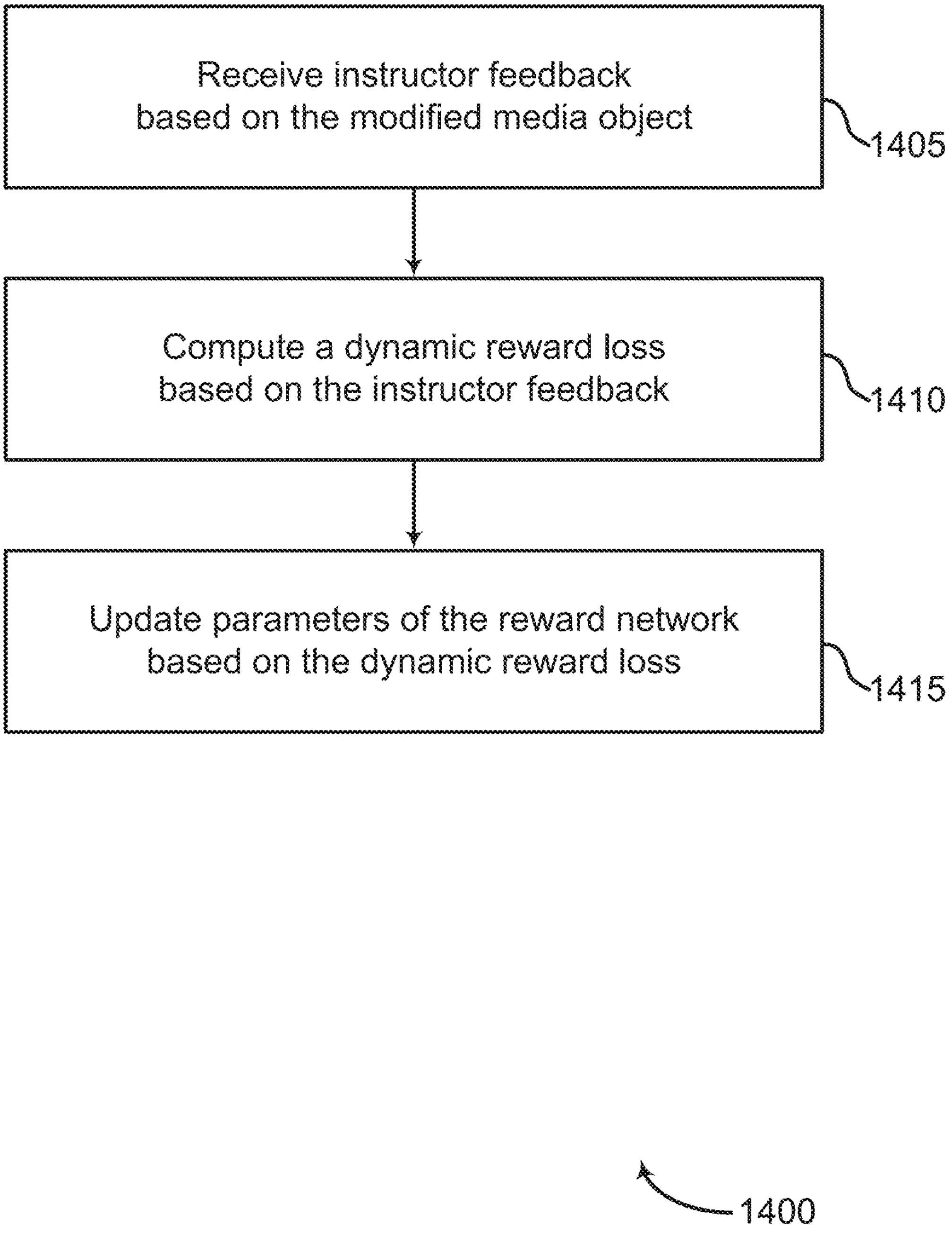
FIG. 14 shows an example of a method for updating a reward network according to aspects of the present disclosure.

FIG. 14 shows an example of a method 1400 for updating a reward network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some aspects, a dynamic reward function described with reference to FIGS. 4 and 7 is implemented as a reward network (such as the reward network described with reference to FIGS. 2 and 15). In some cases, a training component (such as the training component described with reference to FIGS. 2 and 15) trains the reward network to output a dynamic reward $r_\phi$ (such as the dynamic reward described with reference to FIG. 7).

At operation 1405, the system receives instructor feedback based on the modified media object. In some cases, the operations of this step refer to, or may be performed by, a contextual media interface as described with reference to FIGS. 2 and 12. For example, in some cases, the contextual media interface receives the instructor feedback as described with reference to FIG. 15.

At operation 1410, the system computes a dynamic reward loss based on the instructor feedback. In some cases, the operations of this step refer to, or may be performed by, a training component as described with reference to FIGS. 2 and 15. For example, in some cases, the training component computes the dynamic reward loss as described with reference to FIG. 15.

At operation 1415, the system updates parameters of the reward network based on the dynamic reward loss. In some cases, the operations of this step refer to, or may be performed by, a training component as described with reference to FIGS. 2 and 15. For example, in some cases, the training component updates the parameters of the reward network as described with reference to FIG. 15. An algorithm for updating parameters of a reinforcement learning model based on an updated reward network is described with reference to FIG. 16.

Figure 15:
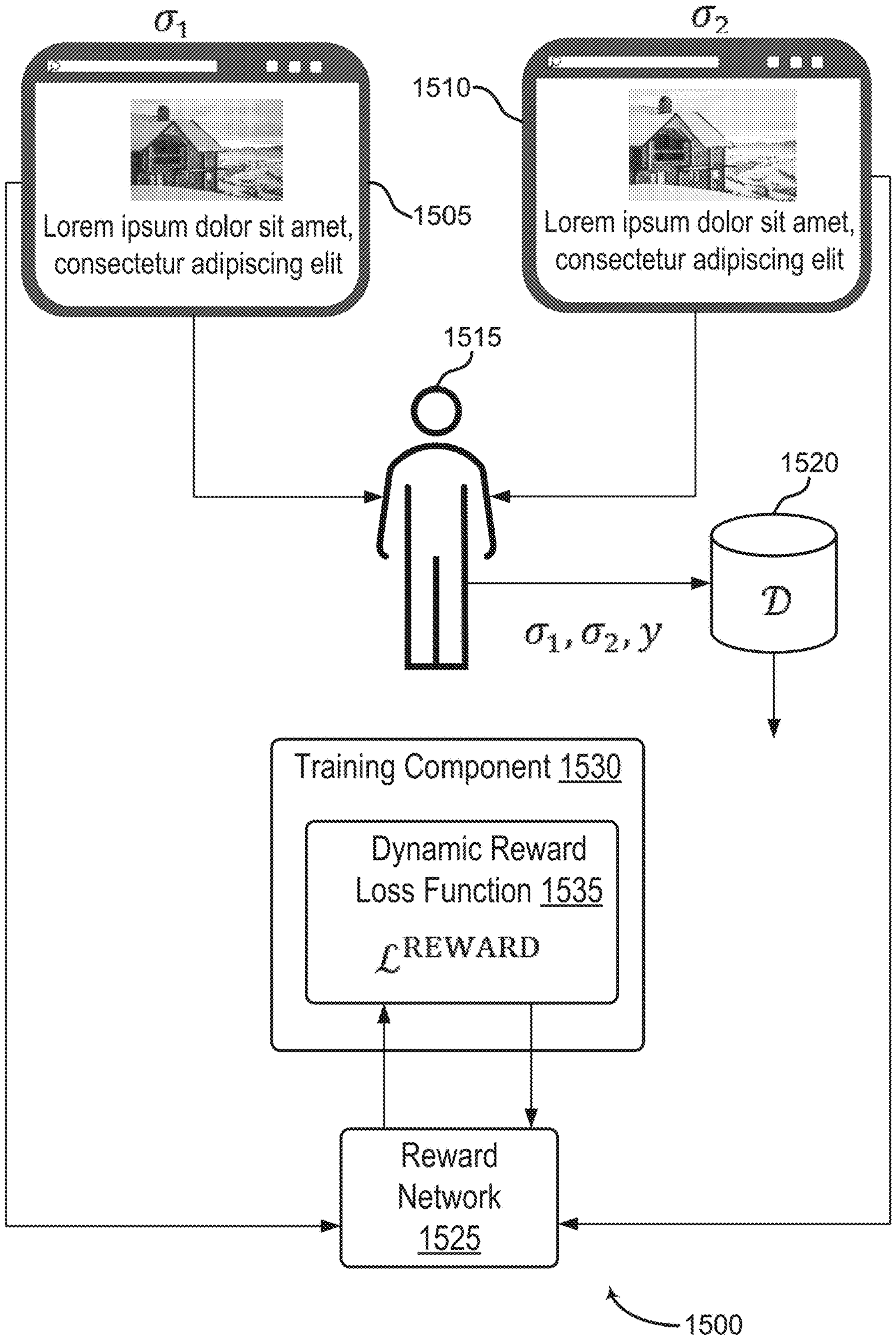
FIG. 15 shows an example of training a reward network according to aspects of the present disclosure.

FIG. 15 shows an example 1500 of training a reward network 1525 according to aspects of the present disclosure. The example shown includes modified media object representation 1505, additional modified media object representation 1510, instructor 1515, database 1520, reward network 1525, and training component 1530. In one aspect, training component 1530 includes dynamic reward loss function 1535.

Modified media object representation 1505 is an example 1500 of, or includes aspects of, the corresponding element described with reference to FIG. 4. Database 1520 is an example 1500 of, or includes aspects of, the corresponding element described with reference to FIG. 1. Reward network 1525 is an example 1500 of, or includes aspects of, the corresponding element described with reference to FIG. 2. Training component 1530 is an example 1500 of, or includes aspects of, the corresponding element described with reference to FIG. 2.

Referring to FIG. 15, instructor 1515 (e.g., a user) is provided modified media object representation 1505 and additional modified media object representation 1510 via a contextual media interface (such as the contextual media interface described with reference to FIGS. 2 and 12). In some cases, each of modified media object representation 1505 and additional modified media object representation 1510 comprises a same context. In some cases, modified media object representation 1505 comprises a modified media object generated based on a media object and a context according to a first trajectory $\sigma_1$, and additional modified media object representation 1510 comprises a modified media object generated on the media object and the context according to a second trajectory $\sigma_2$.

In some cases, the contextual media interface receives an input from instructor 1515 indicating a preference $\gamma \in \{(1,0), (0,1)\}$ (e.g., instructor feedback) for either modified media object representation 1505 or additional modified media object representation 1510. In some cases, the contextual media interface adds first trajectory $\sigma_1$, second trajectory $\sigma_2$, and the preference $\gamma$ in a dataset $\mathcal{D}$, thereby obtaining a reward network training dataset that includes not only changes made to a media object for a context but also a human response to those changes. In some cases, contextual media interface stores the dataset $\mathcal{D}$ in database 1520 (such as the database described with reference to FIG. 1).

In some cases, reward network 1525 receives modified media object representation 1505 and additional modified media object representation 1510 and determines a reward network preference for either modified media object representation 1505 or additional modified media object representation 1510. In some cases, training component 1530 trains reward network 1525 based on a comparison between the reward network preference and the instructor preference $\gamma$.

For example, in some cases, reward network 1525 computes a preference predictor $P_\phi(\sigma_2 > \sigma_1)$ modeled using the dynamic reward function $r_\phi$:

$$P_\phi(\sigma_2 \succ \sigma_1) = \frac{\exp\left\{\sum_t r_\phi\left(s_t^1, a_t^1\right)\right\}}{\sum_{i\in\{0,1\}} \exp\left\{r_\phi\left(s_t^i, a_t^i\right)\right\}} \tag{3}$$

In some cases, $\sigma_2 > \sigma_1$ denotes a preference for a modified media object corresponding to second trajectory $\sigma_2$ over a modified media object corresponding to first trajectory $\sigma_1$.

In some cases, training component 1530 computes a dynamic reward loss using dynamic reward loss function 1535 based on the preference predictor and instructor preference $\gamma$:

$$\mathcal{L}^{Reward} = -\mathbb{E}_{(\sigma_1,\alpha_2,y)-\mathcal{D}}[y(0)\log P_\phi(\sigma_2 \succ \sigma_1) + y(1)\log P_\phi(\sigma_2 \succ \sigma_1)] \tag{4}$$

In some cases, training component 1530 updates parameters of reward network 1525 based on the dynamic reward loss. Accordingly, by training the reward network based on a dataset obtained using instructor feedback, the media generation apparatus implements a reinforcement learning model that is positively rewarded, via the dynamic reward $r_{\phi}$, by generating a modified media object that would appear to a human observer to be appropriate for an input context.

FIG. 16 shows an example of an algorithm 1600 for updating a reinforcement learning model according to aspects of the present disclosure. Referring to FIG. 16, algorithm 1600 is pseudo code for training a reinforcement learning model (such as a reinforcement learning model described with reference to FIGS. 2-4) based on training a reward network (such as the reward network described with reference to FIGS. 2 and 15) implemented as a dynamic reward function (such as the dynamic reward function described with reference to FIGS. 4 and 15).

In an example, algorithm 1600 begins within the reinforcement learning model initializing a frequency of obtaining instructor feedback via a contextual media interface as described with reference to FIGS. 14 and 15 and a number of instructor feedback queries. In some cases, the reinforcement learning model implements algorithm 1100 described with reference to FIG. 11 to produce trajectories conditioned by the static reward function. In some cases, lines 9-20 of algorithm 1600 describe steps for training the reward network based on instructor feedback as described with reference to FIGS. 14-15, and lines 21-30 of algorithm 1600 describe steps for updating parameters of an agent of the reinforcement learning model (such as an agent described with reference to FIGS. 2-5) based on the updated reward network.

Referring to FIG. 16, in some cases, with respect to lines 11-16, the first event occurs after K iterations. In some cases, pairs of trajectories are uniformly sampled and then sent to instructors for feedback. In some cases, the trajectory pairs and corresponding feedback is recorded in a dataset $\mathcal{D}$. In some cases, with respect to lines 17-20, the reward network is trained. In some cases, in a parameter update event, the agent performs an action $a_t$ and observes reward $r_t$. In some cases, with respect to lines 28-30, after a mini-batch of transitions (e.g., $s_t$, $a_t$, $s_{t+1}$, $r_t$) are sampled, parameters of the actor network, the critic network, the target actor network, and the target critic network are updated.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for media generation, comprising:

obtaining a media object and context data describing a context of the media object, wherein the media object comprises one or more modification parameters;

generating, using a reinforcement learning model, a modified media object by iteratively optimizing the one or more modification parameters based on the context data and a reward value comprising a static reward and a dynamic reward, wherein the static reward is computed based on a comparison of a feature of the modified media object and a range of values for the feature of the modified media object and wherein the dynamic reward is generated by a machine learning model trained to generate dynamic rewards based on a training dataset including preference data; and providing the modified media object within the context.

2. The method of claim 1, wherein:

the context comprises a graphical user interface.

3. The method of claim 2, wherein:

the context data includes at least one of a background color, a font style, or a font color of the graphical user interface.

4. The method of claim 1, wherein:
the one or more modification parameters includes a contrast, a hue, and a brightness of the media object.

5. The method of claim 1, further comprising:
receiving feedback based on the modified media object;
computing the reward value based on the feedback; and
updating the reinforcement learning model based on the reward value.

6. The method of claim 5, further comprising:
generating a subsequent modified media object using the updated reinforcement learning model.

7. The method of claim 1, further comprising:
generating state information for the media object based on features of the media object, wherein the modified media object is generated based on the state information.

8. The method of claim 1, further comprising:
selecting an action from an action set corresponding to potential values of the one or more modification parameters using the reinforcement learning model, wherein the modified media object is generated by applying the action to the media object using a media editing application.

9. The method of claim 1, wherein:
the training dataset further includes a training media object, a first modification of the training media object, a second modification of the training media object, and wherein the preference data indicates a preference of the first modification over the second modification.

10. A method for media generation, comprising:
obtaining a media object and context data describing a context of the media object, wherein the media object comprises one or more modification parameters;
generating a modified media object by adjusting the one or more modification parameters using a reinforcement learning model based on the context data;
computing a reward value comprising a static reward and a dynamic reward, wherein the static reward is computed based on a comparison of a feature of the modified media object and a range of values for the feature of the modified media object and wherein the dynamic reward is generated by a machine learning model trained to generate dynamic rewards based on a training dataset including preference data; and
updating parameters of the reinforcement learning model based on the reward value.

11. The method of claim 10, further comprising:
determining whether the adjusted modification parameter is within the range of values for the feature of the modified media object, wherein the reward value is based on the determination.

12. The method of claim 10, further comprising:
computing the dynamic reward based on state information for the media object.

13. The method of claim 10, further comprising:
receiving instructor feedback based on the modified media object;
computing a dynamic reward loss based on the instructor feedback; and
updating parameters of the machine learning model based on the dynamic reward loss.

14. The method of claim 13, further comprising:
generating an additional modified media object, wherein the instructor feedback is based on the additional modified media object.

15. The method of claim 14, further comprising:
including in a dataset a first trajectory corresponding to the modified media object, a second trajectory corresponding to the additional modified media object, and the instructor feedback.

16. The method of claim 10, wherein:
the training dataset further includes a training media object, a first modification of the training media object, a second modification of the training media object, and wherein the preference data indicates a preference of the first modification over the second modification.

17. An apparatus for media generation, comprising:
a processor; and
a memory including instructions executable by the processor to perform the steps of:
obtaining a media object and context data describing a context of the media object, wherein the media object comprises one or more modification parameters;
selecting, by a reinforcement learning model, an action for modifying the one or more modification parameters based on the context data, wherein the parameters of the reinforcement learning model are updated using a reward value comprising a static reward and a dynamic reward, wherein the dynamic reward is generated by a machine learning model trained to generate dynamic rewards based on a training dataset including preference data; and
generating a modified media object by iteratively optimizing the one or more modification parameters based on the action, wherein the static reward is computed based on a comparison of a feature of the modified media object and a range of values for the feature of the modified media object.

18. The apparatus of claim 17, further comprising:
a contextual media interface configured to display the modified media object within the context.

19. The apparatus of claim 17, further comprising:
a training component configured to update parameters of the machine learning model.

20. The apparatus of claim 17, wherein:
the training dataset further includes a training media object, a first modification of the training media object, a second modification of the training media object, and wherein the preference data indicates a preference of the first modification over the second modification.

* * * * *